(12) United States Patent
Luyssaert et al.

(10) Patent No.: US 7,445,390 B2
(45) Date of Patent: Nov. 4, 2008

(54) METHOD AND SYSTEM FOR OPTICALLY COUPLING COMPONENTS

(75) Inventors: Bert Luyssaert, Ghent (BE); Kris Naessens, Melle (BE); Ronny Bockstaele, Merelbeke (BE)

(73) Assignees: Interuniversitair Microelektronica Centrum (IMEC), Lueven (BE); Universiteit Gent (RUG), Ghent (BE)

( * ) Notice: Subject to any disclaimer, the term of this patent is extended or adjusted under 35 U.S.C. 154(b) by 0 days.

(21) Appl. No.: 11/523,990

(22) Filed: Sep. 20, 2006

(65) Prior Publication Data
US 2007/0077009 A1 Apr. 5, 2007

Related U.S. Application Data

(60) Provisional application No. 60/718,980, filed on Sep. 20, 2005.

(51) Int. Cl.
*G02B 6/36* (2006.01)
(52) U.S. Cl. .......................................... 385/88; 385/53
(58) Field of Classification Search .................. 385/53, 385/88
See application file for complete search history.

(56) References Cited

U.S. PATENT DOCUMENTS 5,118,923 A 6/1992 Farina
7,187,444 B2 * 3/2007 Naya et al. .................. 356/445
2005/0036741 A1 2/2005 Rodighiero et al.
2006/0045421 A1 * 3/2006 Baets et al. .................. 385/33

FOREIGN PATENT DOCUMENTS

EP 0 886 352 A1 12/1998
JP 2002 273742 9/2002

* cited by examiner

*Primary Examiner*—Jennifer Doan
(74) *Attorney, Agent, or Firm*—McDonnell Boehnen Hulbert & Berghoff LLP

(57) ABSTRACT

A method is described for providing a predetermined optical path in an optical module, the predetermined optical path being defined by predetermined optical characteristics for the optical module. a modifiable optical element is provided at a predetermined position in the optical module, thus generating an initial optical path of the optical module. The modifiable optical element comprising at least one optical interface in the initial optical path. An optical signal is detected from a radiation beam on the initial optical path of the optical module. The optical interface of the modifiable optical element is then physically modified to generate at least one modified optical interface of the modifiable optical element. The physical modification takes into account the detected optical signal so as to obtain substantially the predetermined optical characteristics for the optical module.

13 Claims, 17 Drawing Sheets

METHOD AND SYSTEM FOR OPTICALLY COUPLING COMPONENTS

BACKGROUND

The present application relates back to and claims the priority of U.S. Provisional Patent Application No. 60/718, 980, filed Sep. 20, 2005.

This disclosure relates to the field of optics and/or opto-electronics. More particularly, it relates to methods and systems for assembling optical and/or opto-electronic components.

Assembly and packaging of micro-optical and optoelectronic components can make up a large part of the economical and manufacturing cost of such components, often up to 80%, due to the difficulties typically encountered in this final production step. Especially when working with single-mode optical components like single-mode fibers, distributed feedback (DFB) lasers, etc. the required alignment accuracy of the element in the final package can become as small as the wavelength of the light that is transported, generated or detected in the components. This often results in a required accuracy of 1 µm or smaller.

One method in use today is based on the application of high-accuracy translation and/or rotation stages that very precisely place the various components making up the system onto their correct location, and welding equipment for welding together these components with very precise welding techniques. Active optical feedback is often applied in these packaging and assembling steps. The long processing times, as well as the high cost of equipment, results in a corresponding high cost for optical packages that are produced using such techniques.

Laser ablation of a lens has been published in Applied Optics, Vol. 38, No. 15, pp. 3338. Here a large-diameter glass lens is coated with a polymer. Material is then removed from this polymer layer by means of a pulsed laser until a certain required phase front is achieved after illumination of the lens. The surface shape of the lens thereby is monitored in situ and corrected to attain the desired aberration level.

In Published U.S. Patent Application No. 2003/0030869, a real-time alignment system of an optoelectronic assembly is described. The optoelectronic assembly typically includes a first optoelectronic device and a second optoelectronic device to be optically coupled to the first optoelectronic device. The alignment system typically includes a capturing means for maintaining a first optoelectronic device in a fixed position and retains the second optoelectronic device in optical engagement with the first optoelectronic device, whereby a plurality of degrees of positional freedom are available for moving the second optoelectronic device with respect to the first optoelectronic device. A feedback system allows detection and correction of positional errors, e.g. due to positional drift by thermal excursions or mechanical strain, such that the first optoelectronic device is in the desired optical alignment with the second optoelectronic device.

In Published U.S. Patent Application No. 2004/0126064, one or more optical or optoelectronic components are mounted to one or more substrates/boards, and an optical assembly is inserted into one or more through-holes in the one or more substrates/boards. The optical assembly is positioned to receive light from or send light to the optical or optoelectronic components and provide a conditioned, for example collimated or focused, beam. The optical assembly comprises at least one lens portion, spacer portion, coupler portion, and a waveguide.

SUMMARY

The apparatus and methods described herein provide an optical path between optical components and describe the use thereof in devices. These apparatus and methods may be used in providing accurate opto-electronic devices.

The apparatus and methods described herein provide a predetermined optical path in an optical module, where the predetermined optical path is defined by predetermined optical characteristics for the optical module. In such a method, a modifiable optical element is located at a predetermined position in the optical module, and an initial optical path of the optical module is generated, wherein the modifiable optical element is in the initial optical path and comprises at least one optical interface. An optical signal, from a radiation beam is detected on the initial optical path of the optical module. The optical interface of the modifiable optical element is physically modified, by machining, for example, to generate at least one modified optical interface of the optical element. The physical modification takes the detected optical signal into account, so as to obtain substantially the predetermined optical characteristics for the optical module. The machining step may be an optical machining step and/or a micro-machining step.

The optical interface may be referred to as the original interface. A plurality of modifiable components may be present. The method also may include positioning the optical emitting element and/or the optical detection element in the optical module. The method allows aligning and packaging an optical module. The optical module may be an opto-electronic module. The methods described herein can be used to obtain accurate optical modules, e.g. accurate opto-electronic modules.

Physically modifying the optical interface of the modifiable optical element may be applied in the optical module. It is an advantage of such embodiments that accurate methods can be obtained whereby problems of misalignment can be efficiently countered. The method may be performed in situ, such that additional errors, introduced after adapting the optical module are reduced or avoided.

Physically modifying may comprise irreversibly physically modifying at least one optical interface of the modifiable optical element. It is an advantage of such embodiments that a method for obtaining a stable and shock-resistant system is obtained with high efficiency and good accuracy, amongst others due to good alignment. The modifiable optical element may be a rigid modifiable optical element. The modifiable optical element may be a modifiable optical element that is non-flexible during use. The modifiable optical element may be non-settable or fixed after manufacturing of the optical module has been completed.

The method furthermore may comprise, after said detecting an optical signal, deriving an optical characteristic for the initial optical path from the optical signal. In that case, taking into account the optical signal comprises taking into account the optical characteristic for the initial optical path. The latter further clarifies the link between the detection and the physical modification.

Physically modifying the at least one optical interface may comprise physically modifying the at least one optical interface to alter the further radiation path such that it crosses or aligns on an optical detection element. It is an advantage of some of these embodiments that the methods for alignment may make use of optical components of the optical module. It is also an advantage of such embodiments that accurate alignment may be performed based on operational characteristics of the optical module, i.e. based on optical characteristics which typically may be used when operating the optical module. The latter allows optimisation directly in respect of optimum properties of the optical module that will be used in operation of the optical module.

The method furthermore may comprise generating an optical signal. It is an advantage of such embodiments, that the method may make use of optical components of the optical module, thus allowing at least partial correction for misalignments of these components. Alternatively, a separate optical emitting element may be used, not part of the optical module. The optical signal also may be generated by a sample to be studied, i.e. it may be a luminescent signal, the optical path being an emission path. The method thus also can be used for biological, chemical or biochemical sensors.

Physically modifying the optical interface may comprise laser ablating the optical interface of the modifiable component. It is an advantage of such embodiments that accurate fine tuning of the optical interface may be performed. It furthermore is an advantage of such embodiments that the required accessibility to the modifiable optical component is restricted to having a direct view between the laser for ablating and the modifiable optical component.

The method may comprise positioning the modifiable optical element at a predetermined position in the optical module thus generating an initial optical path of the optical module. It is an advantage of such methods that they can be combined with existing simulation methods for determining the optimum alignment, such that only fine-tuning needs to be performed with a machining step such as laser ablation. The latter may allow reduction of the time and effort needed to optimise the optical module. The method may comprise prior to the positioning, computing an optimal position of the modifiable optical element in the optical module and using the optimal position as predetermined position.

The physical modification may take into account the optical signal so as to obtain substantially at least one of a predetermined coupling efficiency between fibres, a predetermined degree of collimation, a predetermined shape of a radiation beam obtained in the optical module, and/or a predetermined overlap between a radiation beam obtained in the optical module and a detector surface. Optimisation can be performed based on a selected optical characteristic of the optical module, e.g. selected as function of the application of the optical module.

The method may include providing feedback from the detecting for the physically modifying, wherein the detecting and physically modifying are performed in an iterative way. The number of steps may be selected as function of the required accuracy for the optical module.

The optical interface may be either planar or non-planar, and the physically modified optical interface may be either planar or non-planar. The modifiable optical element may be made of a material wherein the modified optical interface may lie deeper in the material. The average plane through the optical interface may make an angle different from zero degrees with respect to an average plane through the modified optical interface. A large variety of optical modules may be optimised. A non-planar interface may, for example, be a curved mirror with the function of redirecting and collimating a beam at the same time. For coupling a small source to a small detector often a 4f system is used, f being the focal distance, meaning that the source is lying at the focus f of a lens and the detector at the focus f of another lens, in between the two lenses a distance of 2f is provided. This configuration may offer the best performances with considering the light beams to be Gaussian beams. As the trimming using a machining step such as ablation is most easily performed on a reflecting interface a curved mirror instead of a lens may be best used in each 4f configuration. Examples are laser-detector couplings, laser-fibre couplings, fibre-fibre couplings, etc.

Physically modifying may include varying the transmission and/or reflection coefficient of the modifiable optical element. The modifiable optical element may be made of a material having a thickness-dependent transmission and reflection property, and the method may comprise thinning of the material in order to induce a predetermined transmission and/or reflection characteristic.

Physically modifying the optical interface of the modifiable optical element may comprise adapting a focus distance of the modifiable optical element. The modifiable optical element may be a diffractive element or a refractive element, e.g. lens. The methods according to the present embodiments may allow modification of the diffractive element or refractive element to tune for an optical property, e.g. wavelength, of radiation typically used during operation of the optical module, resulting in more appropriate diffractive elements or lenses.

The optical interface of the modifiable optical element may comprise a metal layer, and the physical modification may comprise locally removing the metal layer. It is an advantage of such embodiments that aperture plates may be formed, allowing reduction of cross-talk between different adjacent micro lenses. One may, during manufacturing, start with a completely covered aperture plate and open the apertures while actively monitoring the input on the detectors lying beneath the micro lenses. Or one may, during manufacturing, start with an aperture plate with small apertures and further open up the individual apertures while monitoring the detector values. More general, optical systems which have apertures, such as complex camera lenses, telescopes, etc., may be improved when the apertures can be adjusted according to the exact alignment of the individual parts.

Physically modifying the interface may include depositing a coating or layer on the interface. Depositing a coating may comprise depositing a metal layer on the at least one interface.

The method furthermore may include modifying a refractive index of a material constituting the modifiable optical element.

The optical module may be an optoelectronic module. The interface of the modifiable optical element may be positioned on the optical path of an optical module, e.g. an opto-electronic module.

The physical modification may include determining an influence of physically modifying at least one interface on an optical signal of a radiation beam following the initial optical path. It is an advantage of such methods that a calibration of the physical modification may be performed, leading to more accurate optical modules.

A method is provided for manufacturing an optical module. The method includes providing a predetermined optical path for a radiation beam in the optical module, wherein the predetermined optical path is defined by predetermined optical characteristics for the optical module. In the method, an initial optical path of the optical module is provided for a modifiable optical element at a predetermined position in the optical module. The modifiable optical element includes at least one optical interface and is in the initial optical path. An optical signal from a radiation beam on the initial optical path of the optical module is detected. The optical interface of the modifiable optical element is physically modified, e.g. by machining, to generate at least one modified optical interface. The physical modification takes into account the detected optical signal so as to obtain substantially the predetermined optical characteristics for the optical module. The method for manufacturing an optical module furthermore may include obtaining a substrate and obtaining a number of optical components for constituting the optical module.

Also disclosed herein is an optical module adapted to receive an incident radiation beam from an optical emission element and to provide the exiting radiation beam to an optical detection element after the optical signal has followed an optical path. The optical module includes a modifiable optical element with an optical interface positioned in the optical path. The optical module is adapted to provide free access to the interface of the modifiable optical element for in-situ physical modification, e.g. by machining, of the interface, taking into account an optical signal representative of the radiation beam detected by the optical detection element after following the optical path. As a result, a predetermined optical path for the optical module having a predetermined optical characteristic is substantially obtained. It is an advantage of such an optical module that it allows for in-situ adaptation of the optical path generated by the optical module for a radiation beam, resulting in an appropriate alignment and consequently a high accuracy and/or efficiency of the optical module.

Providing free access to at least one interface of the modifiable optical element may include providing a direct view, e.g. avoiding absorbing material, between a machining device such as a laser ablation system and the interface of the modifiable optical element. The modifiable optical element may be a rigid optical element, e.g. an optical element that is non-flexible or non-settable or fixed once manufacturing of the optical module has been completed, so that it is irreversibly settable during manufacturing.

The optical module may be an opto-electronic module comprising an optical emission element for generating an incident optical signal and an optical detection element for receiving the exiting optical signal.

Also described herein is a computer program product that, when executed on a computing device, is adapted to perform a method for assisting in providing a predetermined optical path in an optical module. The predetermined optical path is defined by predetermined optical characteristics for the optical module. In the method, a modifiable optical element is positioned at a predetermined position in the optical module. This generates an initial optical path of the optical module. The modifiable optical element comprises at least one optical interface in the initial optical path. An optical signal is received that is representative of detection of a radiation beam that has followed the initial optical path of the optical module. Physical machining modification parameters are determined for the optical interface to generate a modified optical interface. The physical modification parameters take into account the received optical signal so as to obtain substantially the predetermined optical characteristics for the optical module. The computer program product may be adapted to provide settings for a physical modification apparatus so as to adapt an optical interface according to said physical modification parameters.

Also described herein are a machine-readable data storage device that stores such a computer program product, the transmission of the computer program product over a local or wide area telecommunications network, and a computing device adapted for executing such a computer program product.

A method for providing a predetermined optical path between an emitting and a receiving optical element is also described. The optical path includes at least one modifiable optical element that has at least one original interface. In the method, the emitting optical element, the receiving optical element, and modifiable optical elements are positioned in a predetermined position, defining predetermined characteristics of a required radiation path. An optical signal is emitted from the emitting optical element. The signal defines a radiation path that does not have the predetermined characteristic. The original interface is then physically modified, e.g. by machining, such that the radiation path has the predetermined characteristic.

In certain embodiments, the step of physically modifying the interface may cause the radiation path to pass onto the receiving optical element.

In particular embodiments, the step of physically modifying the interface is performed by any suitable machining process of which laser ablation of the interface is only one example. Other techniques, such as laser-writing and e-beam writing in resist (locally illuminating the resist and possibly performing an additional development step), focused ion beam milling, dry etching, deep lithography with protons, or diamond turning may be applied.

In certain embodiments the original interface is planar, and the modified interface is planar. The modified interface may have an angle different from 0 degrees with respect to the original interface. In other embodiments the modified interface is parallel to the original interface and lies deeper in the material. The optical system may have an interface which comprises a material layer with thickness-dependent transmission and reflection properties, and the thinning of the material layer is performed in order to achieve a predetermined reflection/transmission characteristic in certain embodiments.

In certain embodiments the original interface is non planar or planar and the modified interface is non planar.

In certain embodiments the original interface is part of a diffractive optical element and the modified interface is a more accurate diffractive optical element.

In certain embodiments the original interface is a lens interface and the modified interface is a corrected lens interface.

In certain embodiments the original interface is non planar, and the modified interface is planar.

In certain embodiments the interface is covered by a mirror layer which is applied on the original interface, and whereby the step of physically modifying the original interface includes locally removing the mirror layer.

In some embodiments, a metal layer is deposited onto the (partially) laser ablated interface.

In certain embodiments, the original interface, typically to be modified, is lying within an optoelectronic module.

An optoelectronic system is disclosed in which the method as described in the previous embodiments can be applied. The system includes an emitting and a receiving optical element, at least one modifiable optical element having at least one original interface, and an optical access path to the interface, such that the interface is modifiable by a machining step such as laser ablation in order to allow approximation towards a predetermined optical path between the emitting and receiving element.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics will become apparent from the following detailed description, taken in conjunction with the accompanying drawings, which illustrate various embodiments by way of example. This description is given

Figure 1:
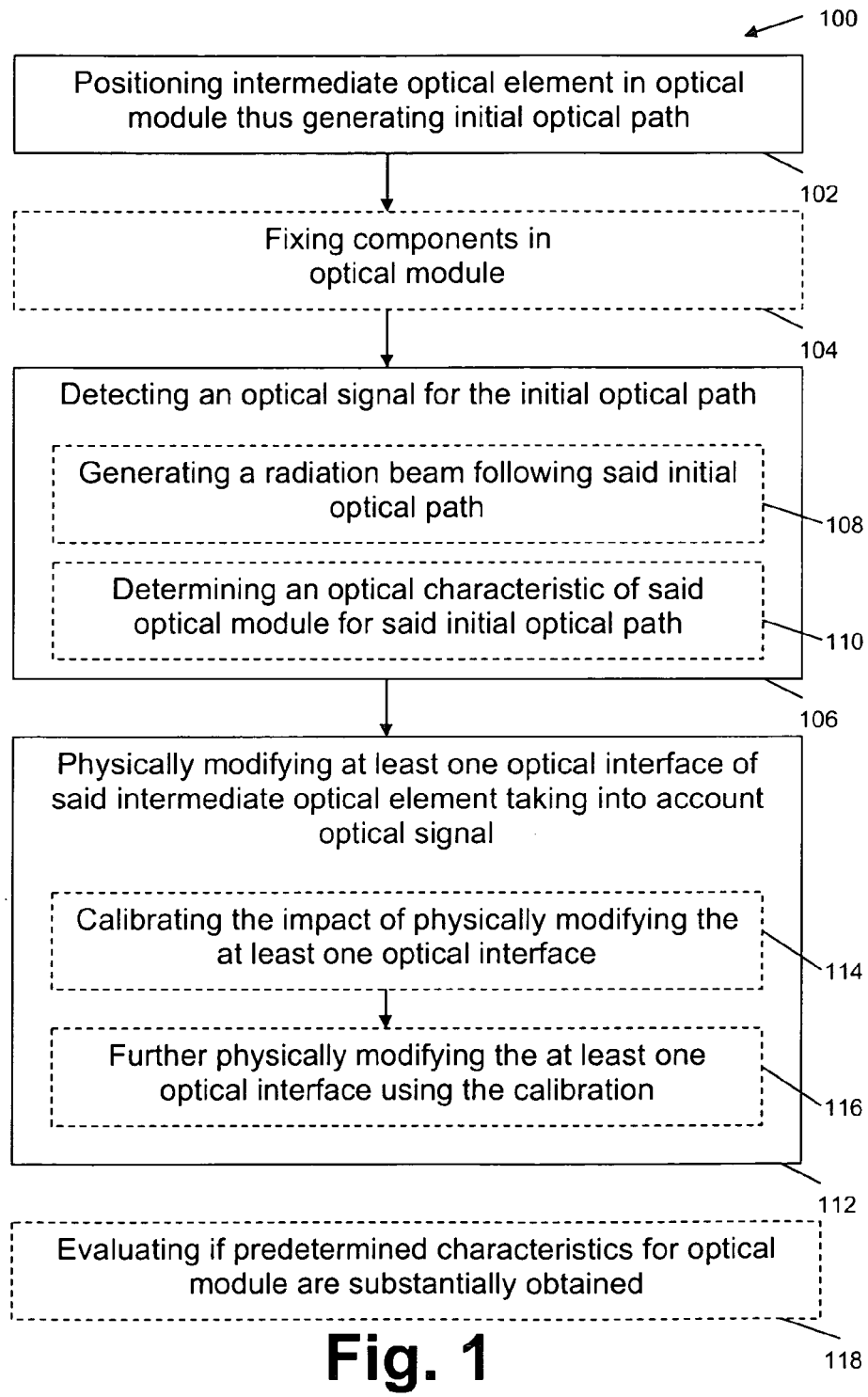
FIG. 1 is a flow diagram of different steps of an exemplary method for providing a predetermined optical path.

In the different figures, the same reference signs refer to the same or analogous elements.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

The terms top and bottom and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B but should include devices that include A and B among other components.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a radiation path between an output of A and an input of B which may be a path including other devices or means.

The following terms are provided solely to aid in the understanding of the invention. These definitions should not be construed to have a scope less than understood by a person of ordinary skill in the art. With the terms "optical," "light," and "radiation," reference is not only made to the visual range of the electromagnetic spectrum but also to ultraviolet radiation and infrared radiation. Moreover, the invention is not limited to these types of radiation and other types of electromagnetic irradiation could also be used. In the present application, the term "optical interface" refers to an optical interface between two materials of a component or a surface of a component. The term physically modifying typically refers to modification based on a physical adding or removal of material, for example—but not limited to—by ablation. The latter may be performed homogeneously over the surface or part thereof or non-homogeneously over the surface or part thereof. Physically modifying typically comprises trimming. With trimming part or trimming surface, reference is made to the optical interface selected for being physically modified. Such an interface may e.g. be modifiable by irradiation with an intense laser beam or beam of particles The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 3:
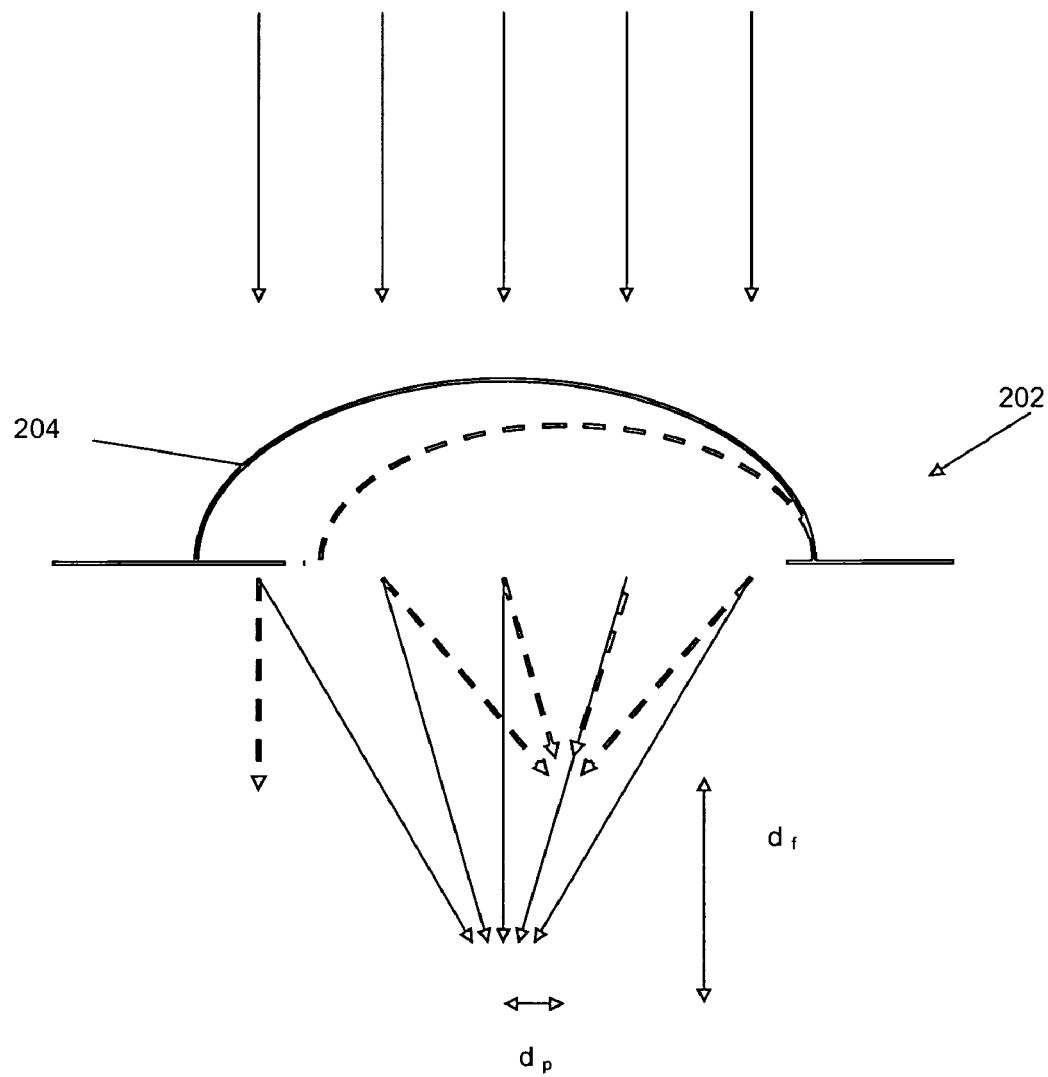
FIG. 3 illustrates the use of laser ablation to adjust the focusing properties, e.g. the focal point, of a lens.
Figure 4:
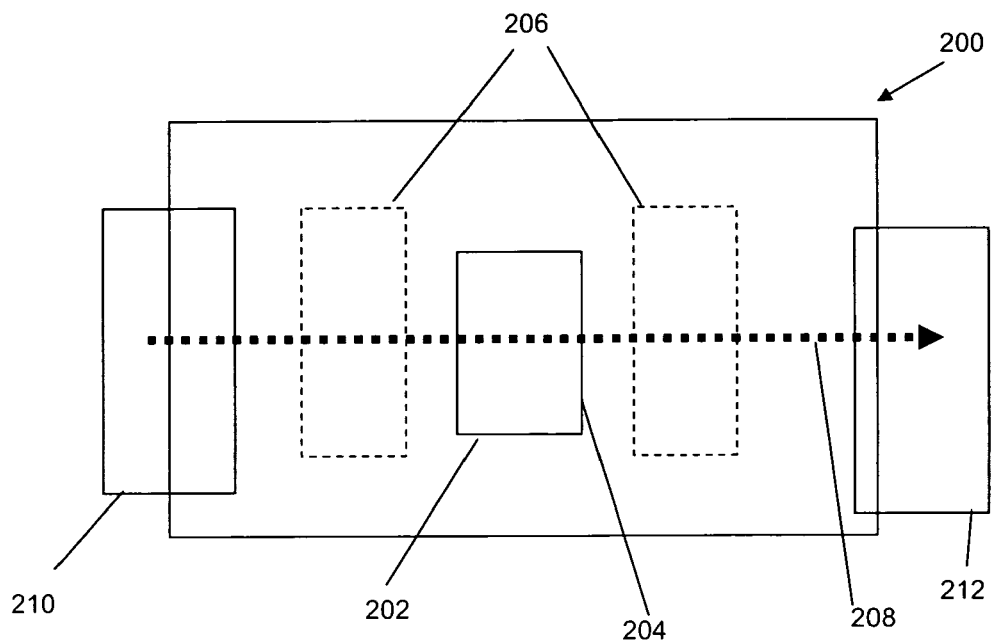
FIG. 4 shows a schematic overview of an optical module.

In a first aspect, a method is described for providing a predetermined optical path in an optical module. Typically the predetermined optical path in the optical module is defined or characterised by predetermined optical characteristics of the optical module. The method typically comprises positioning a modifiable optical element at a predetermined position in the optical module, thus generating an initial optical path of the optical module. The modifiable optical element typically comprises at least one optical interface and typically is positioned in the initial optical path. The method also comprises detecting an optical signal for a radiation beam passed on the initial optical path of the optical module. It furthermore comprises physically modifying the optical interface of the modifiable optical element thus generating at least one modified optical interface of the modifiable optical element. The physical modification thereby takes into account the detected optical signal so as to obtain substantially the predetermined optical characteristics for the optical module. Different standard and optional steps of the method for obtaining a good optical path for an optical module will be described in more detail, by way of an exemplary method 100 as shown in FIG. 1 and by way of an exemplary optical module 200, as shown in FIG. 4, for which a method 100 for providing a predetermined path typically may be performed, the present invention not being limited thereto. The optical module 200 typically comprises a modifiable optical component 202, having at least one optical interface 204 that can be physically modified. It furthermore typically may comprise further optical components 206. The optical path 208 typically is determined by the components of the optical module 200, more particularly, by the different components 202, 206 of the optical module 200 present along the optical path 208 of the optical module 200. The optical path 208 of the optical module, and correspondingly the optical characteristics of the optical module, thus may be altered by altering an optical component 202 of the optical module 200. The optical module 200 furthermore may be adapted for detecting an optical signal for a radiation beam that has followed the optical path 208 in the optical module 200. The optical module 200 therefore may comprise an optical emitting element 210 and an optical detection element, although one or both of these elements may be positioned outside the optical module 200. The method 100 furthermore will be illustrated with respect to FIG. 2 and FIG. 3.

The method 100 typically may comprise positioning 102 a modifiable optical element 202 at a predetermined position in the optical module 200, thus generating or defining an initial optical path 208 in the optical module 200. This step also may comprise positioning other components 206 which will make part of the optical module 200 on predetermined positions, which thus also may define the initial optical path 208. In other words, the pre-existing optical module thus already forms a rough optical path between various optoelectronic components, e.g. between an active component, like an LED or a VCSEL, and a passive component like a detector or a detector array. The predetermined positions typically are determined from an initial approximation for the alignment, which may be determined based on a first-guess. The modifiable optical component 202 typically has at least one optical interface 204 that may be physically modified. This interface 204, which may be a surface or physical interface, can be flat or curved, and can be microstructured or not. Typical microstructures are gratings, diffractive lenses and fine metal patterns. Whereas in the present illustration only a single modifiable optical element is shown and a single optical interface is shown which can be physically modified, both the number of modifiable optical elements modified as the number of optical interfaces of such elements may be larger than one. The method also may refer to a method for providing an optical path performed after positioning of the modifiable optical element, e.g. for an assembled optical module. The modifiable optical component typically may be a rigid component. In other words, it may be non-settable or non-flexible after manufacturing and thus fixed or non-settable during use of the optical module. The modifiable optical component may be any type of component such as a reflective surface, a reflector or mirror, a refracting element e.g. lens, a diffractive element such as e.g. a grating, etc. The modifiable optical component may be a component lying in between other components on the optical path of an optical module 200. It thus may be positioned intermediate between other components, e.g. between other components of the optical element differing from, if present, the optical receiving element 212 and the optical emitting element 210.

In preferred embodiments, after the initial positioning step 102, i.e. the initial alignment performed in the optical module 200, or alignment, a step of fixing 104 the various components 202, 206 in the optical module 200 may be performed, for example the modifiable optical element and typically also the other components which will make part of the optical may be encapsulated or molded into a package for the optical module 200. Provision of a the predetermined optical path, or correspondingly therewith further alignment of the components in the optical module 200, then typically may be performed by in-situ physically modifying the at least one optical interface 204 of the modifiable optical element 202. In this package at least one optical interface 204 of the modifiable optical element 202, which is on the optical path inside the package, typically may be accessible from outside the optical module. Typically, with accessible from outside the optical module 200 there is meant that no other components of the optical module 200 substantially hinder the physically modifying of the at least one optical interface. In some embodiments, the latter may mean that there is a direct view, i.e. no substantially absorbing components present, between the at least one optical interface and the means for physically modifying the optical interface.

In a further step, the method also comprises detecting 106 an optical signal for a radiation beam passed on the initial optical path 208 of the optical module 200. Detection of such an optical signal typically may be performed using an optical detection element 212. In order to detect the optical signal, generating 108 of a radiation beam following the initial optical path 208 also may be performed, although the radiation beam could be captured from an optical source present in the environment, e.g. stemming from a luminescent phenomenon. Generating 108 a radiation beam may be performed using an optical emitting element 210. The optical emitting element 210 may be any suitable light source emitting radiation at a wavelength suitable for the optical module 200. In a preferred embodiment, as will be described later in more detail, the optical emitting element 210 allows generation of radiation beams with different spatial distribution, in order to obtain optimum information for optimising the optical path and thus the optical characteristics of the optical module 200. In order to perform detecting 106 of an optical signal, a measurement means, as for instance an internal or external sensing part, may be provided, which may be permanent (part of a final product) or temporarily positioned in the optical path 208 or at the end of the optical path 208 of the optical module 200. Typically, if a permanent measurement means is present, a higher accuracy may be expected, and fewer alignment steps for the measurement means are involved. For example, only a single alignment of the measurement means may need to be performed. The measurement means may be part of the optical path 208 or may be tangential to the optical path 208. Tangential means that it is in such a position that it may provide information on the characteristics of the light beam even though it is not in the predetermined path to be obtained, for example not in an optical path used during standard operation of the optical module. The detected optical signal may comprise one or more parameters or one or more parameters derived therefrom, also referred to as optical characteristics for the optical path 208 and thus optical characteristics for the optical module 200. In particular embodiments, the method 100 thus furthermore comprises determining 110 an optical characteristic of the optical module for the initial optical path. Such optical signal or optical characteristics for the optical path 208 and thus for the optical module 200 typically will be used to initiate or monitor the modification process of the optical component. The optical signal or parameters may be for example the coupling efficiency for a light beam from an emitting optical element towards a receiving optical element. Other parameters, which as said before may come in sets, are for instance the spatial distribution of a light signal as a light beam, the width of a light beam, the direction distribution or main direction of the beam, the power distribution and the integrated total power of the beam.

Some examples of approaches for detecting 106 an optical signal are provided, depending on the specific functionality of the radiation beam in the package: If the radiation beam couples from a component in the module to an exit part, the position of the radiation beam in the exit part can be straightforwardly measured using a camera system, or a tool that fits in the exit part and that consists of multiple detectors (like a quadrant detector). If the radiation beam is used to couple the input part to a component in the module, then the misalignment can be measured by varying the position of the radiation beam at the input and measuring the response of the optical component in the module. If the light beam couples from one part in the module to another part in the module, then the method includes launching radiation into that optical path and measuring the response in the receiving part of the module. In this setup, typically it is not possible to change the start position of the radiation beam, nor is it possible to monitor the exact position of the radiation beam at the receiving part. Only the overlap between the radiation beam and the optical receiving part is known, without having information of the relative direction of the misalignment.

The optical detection element 212 used may be any detector suitable for detecting a radiation beam of the wavelength used for performing the alignment test. Preferably the optical detection element 212 used is a position sensitive detector or multi-pixel detector, allowing one to obtain information on where the radiation beam hits the optical detection element 212 and/or e.g. about the shape of the radiation beam. The detector element alternatively may be scanned to obtain position-dependent information. The optical detection element 212 may be a photo detector, a photodiode, a CCD detector, a CMOS detector, among other possible detection elements. The detecting step 106 may comprise detecting the intensity, the width of the radiation beam, the spatial distribution of the radiation beam, the power distribution of the radiation beam and/or the integrated total power of the radiation beam. The optical detection element 212 thus may be adapted for detecting these properties.

A following step comprises physically modifying 112 the at least one optical interface of the modifiable optical element for obtaining an optical path in the optical module that is closer to the optical path generating the predetermined optical characteristics for the optical module. Physically modifying 112 therefore takes into account the detected optical signal corresponding with the initial optical path in the optical module 200. The latter may be performed by directly taking into account the detected optical signal or by taking into account parameters, i.e. optical characteristics for the initial optical path 208 or the corresponding optical module 200, derived from the detected optical signal.

In some embodiments, physically modifying 112 at least one optical interface comprises trimming, e.g. by a suitable machining step such as laser ablation. A laser beam is directed towards an optical surface 204 of a modifiable optical element 202 and removes material at the location of this surface. The optical surface of the modifiable optical element 202 typically forms a part of this optical path, i.e. it is in the optical path. Typically due to the trimming of the optical surface, the optical path in the optoelectronic components changes and the optical path in the optical system changes. The properties of the applied laser beam for laser ablation are chosen such that it is a pulsed beam and that every pulse removes a certain amount of material of the interface or roughens the interface. To ablate the laser light should have distinct properties. The pulse duration of the laser light is in the femtosecond to microsecond range. To remove material there is a threshold for the fluency below which no material is removed, the exact value depends on the material and the laser wavelength used. The wavelength of the laser should be well absorbed by the material of the interface or multi-photon absorption should be applied. When a cross-section of the laser beam used to ablate the modifiable optical element 202 has a constant fluency profile, the shape of the modifiable optical element 202 can be changed by moving it in the path of the beam by means of placing it on a moveable stage or table. The same technique is possible by keeping the modifiable optical element 202 fixed and moving the ablation laser beam. Another method of changing the lens is to keep the lens on a fixed location and use an ablation laser beam with a fluency profile other than constant. This can be achieved by placing a predefined aperture mask, grayscale mask, or other mask in the path of the ablation laser beam or by using the edge slope of this beam.

Figure 2:
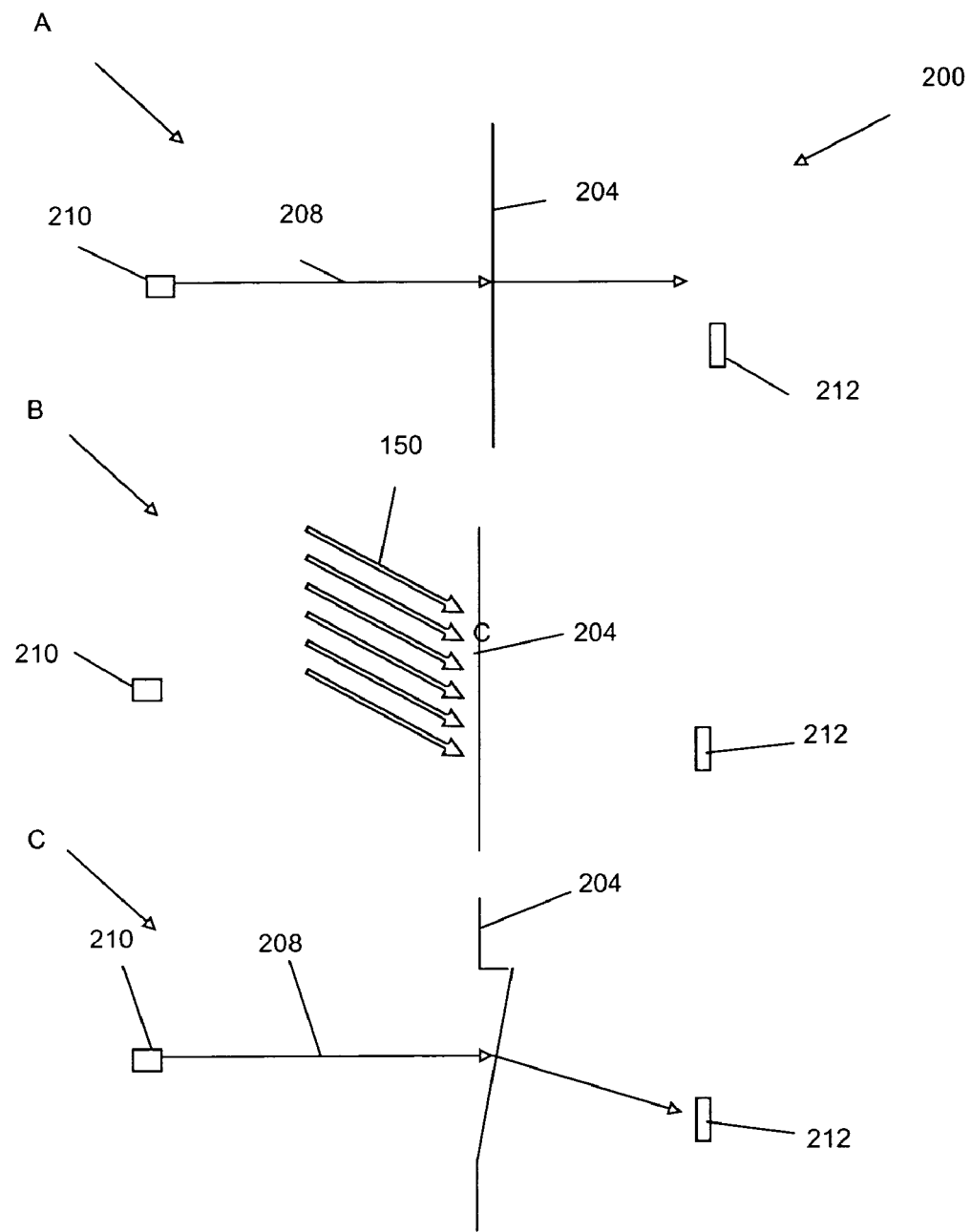
FIG. 2 illustrates the use of laser ablation to adjust or compensate for misaligned source and detector in an optical module.

Physically modifying also may comprise performing other techniques, where appropriate, e.g. machining techniques. For instance laser-writing or e-beam writing in resist may be used, whereby typically local illumination of the resist is performed and an additional development step may be required. Exemplary other alternatives are focused ion beam milling (FIB), dry etching, deep lithography with protons or diamond turning may be applied. FIG. 2 and FIG. 3 illustrate the principle and possible effects of physically modifying an optical interface of a modifiable optical element 202. FIG. 2 shows a step of physically modifying an optical interface 204 of a modifiable optical element 202 in order to alter the direction of a radiation beam in the optical module. In part A, an optical system is shown wherein an optical emitting element 210 and an optical detection element 212 are shown and wherein an optical interface 204 of a modifiable optical element is positioned on the optical path 208. The optical system is such that a radiation beam of the radiation source does not reach the detector. Part B indicates the process of physically modifying the interface 204, in the present example using an ablation laser beam 150. The resulting optical system is shown in Part C, indicating the modified optical interface and, corresponding therewith, the modified optical path in the optical system. FIG. 3 shows a step of physically modifying an optical element 202 in order to alter a focus point of a radiation beam and to shift a focus point of a radiation beam. A modifiable optical element 202 is shown, whereby the full line indicates the non-modified optical interface 204 and the corresponding focussing of the radiation beam, whereas the dashed line indicates the altered optical interface 204 of the modifiable optical element 202 with the corresponding focussing of the radiation beam. The shift in focal length $d_f$ and the shift in lateral focus position $d_p$ also is indicated in FIG. 3.

As indicated in the description of step 106, optionally physically modifying may be performed simultaneously or may be performed alternating with monitoring of an optical signal of a radiation beam following the optical path in the optical module or monitoring parameters/characteristics derived therefrom. The process of physically modifying thus may be performed iteratively, whereby e.g. a number of modifications of the interface may be performed, alternated with parameter set measurement, which may be required to monitor the efficiency of the different modification steps. Typically, the method therefore may comprise providing feedback between the monitored optical signal or corresponding parameter/characteristics and a physically modifying means, such that information is provided about the physically modification performed in a previous step.

In some embodiments, physically modifying 112 typically comprises calibrating 114 the impact of initial physically modifying 112 the at least one optical interface 204 and then further physically modifying 116 the at least one optical interface 204, taking into account the calibration. Such a calibration typically is a calibration of the impact of the trimming on the alignment of the radiation path in the module. Such a calibration may be performed in different ways, e.g. experimentally or model-based. Typically such a calibration comprises providing one (or more) initial physical modifications to the at least one optical interface 204 of the modifiable optical element 202 and determining the influence on the radiation beam or an optical signal representative thereof, e.g. on the position of the radiation beam. The initial physical modification thereby typically is small. Calibrating then further comprises using the relation between the modification and the influence on the radiation beam or an optical signal representative therefore to calculate the desired physical modification parameters based on the optical signal or corresponding parameters detected for the initial optical path 208 in step 106. In other words, the change of the behaviour, e.g. alignment, of the radiation beam allows one to calculate the desired change to the at least one optical interface and thus to the corresponding physical modification parameters. If a model-based calibration is used, an optical modelling simulation, e.g. ray-tracing, and/or beam propagation tools typically may be for determining the effect of an initial physical modification of at least one optical interface 204. If an experimental method is used, e.g. multiple small changes may be brought to the at least one interface 204, and the resulting behaviour of the radiation beam may be monitored. This typically may be based on a trial-and-error approach. Depending on the specific functionality of the radiation beam in the package, calibration thus can for example be provided as follows: If the radiation beam couples from a component in the module to an exit part, the change in alignment of the output radiation beam relative to the exit part can be measured between the initial detection, as described in the detecting step 106, and a detecting step after an initial physical modification. If the light beam is used to couple the input part to a component in the module, the change of the response as function of the alignment of the input beam, measured before and after bringing a small change to the trimming interface, may allow determination of the optimal trimming parameters. If the light beam couples from one part in the module to another part in the module, then the method typically requires launching light into that path and measuring the response in the optical detection element 212 for the module 200. In this setup, it is not possible to change the start position of the light beam, nor is it possible to monitor the exact position of the light beam at the receiving part. Only the overlap between the light beam and the receiving part is known, without having information of the relative direction of the misalignment. No model-based approach can be used as one is only able to measure the absolute misalignment and one is not able to know in which direction the light beam is pointing. The method thus typically may be performed by bringing several small changes to the trimming part, and monitoring the response at the optical detection element 212. Physically modifying 112, typically may, either after or during calibrating 114 or directly, comprise determining physical modification parameters, taking into account the detected optical signal or corresponding parameters/characteristics, such that a desired change to the at least one optical interface 204 of the modifiable optical element 202 is obtained.

The method also may comprise evaluating 118 whether a predetermined optical path is substantially obtained in the optical module. Typically such an evaluation may be performed by checking whether optical parameters of the optical path or corresponding therewith of the optical module have reached a predetermined level. Such predetermined levels may e.g. be expressed as a predetermined degree of efficiency, detected intensity, detected power, etc. is obtained or whether shape or optical properties of a radiation beam in the optical module are within predetermined parameter ranges. Such an evaluation may be performed in an automated and/or automatic way. It may be computerised and may be based on predetermined algorithms or neural networks. Evaluating typically may comprise indicating that further physical modifying is required if the predetermined level is not reached or indicating that no further physical modification is required.

When using physical modification techniques, such as e.g. laser ablation, to alter an existing surface-optical element, often material can only be removed from these elements, e.g. by machining. The need for optimizing an existing element always stems from an uncertainty in the assembly of the element, like the position of a lens relative to an optoelectronic device like a detector, or from an uncertainty in the technique used to initially create the element, like an error on the lens diameter or focal distance. It is advantageous to know the uncertainties or at least upper limits to these uncertainties; in other words, these uncertainties may be taken into account when the techniques described herein are to be applied. The initial surface-optical element should be designed with these uncertainties in mind and with the condition that material can only be removed. Examples typically are the fabrication of the initial lens with a diameter that is too large and a focal distance that is too small, as both can be improved by removing lens material by using physical modification by removal of material, e.g. a machining technique such as laser ablation. Another example is choosing the depth of the diffractive optical element too shallow, as again physical modification by removal of material, e.g. laser ablation, can deepen the wells in the element.

In other embodiments the use is described of physically modifying, e.g. trimming, of a surface-optical element within an optical module, i.e. in situ. This module typically comprises an optical component, an entry part and a sensing part. Both the radiation entry part and the radiation sensing part can be located internal or external, e.g. connected by an optical fiber, in respect to the module. The optical component thereby is modifiable, e.g. has a trimmable surface. The physical quantity measured by the internal or external sensing part typically may be used in an optical feedback loop in the trimming of the said surface-optical element. To allow for higher precision or extra parameters to control the modifying by use of the optical feedback loop, another entry or sensing part may be used during the fabrication of the module than during regular use of the module. Such an alternative entry part or sensing part also may be referred to as master tool.

In certain embodiments an existing structure or system, which is already exhibiting an first-guess or approximated to the predetermined optical path, is locally modified by means of a machining technique such as laser ablation of an optical interface of this system, to modify the optical path and make it approach or correspond better to the predetermined optical path. Furthermore, better predetermined optical characteristics for the optical module may be obtained whereby better optical characteristics are achieved for a radiation beam following the optical path in the optical module. The physical modification, e.g. removal of material, of the optical interface changes one or more properties of a light beam transmitted through or reflected at the optical surface. Some properties that could be changed are the width, the divergence or the direction of the light beam, the power distribution within the beam, or the total power in the beam (by for instance a change in reflection or transmission of the surface).

The method or parts thereof may be performed in an automatic and/or automated way. Typically the steps of the method or part of the steps may be performed according to predetermined algorithms, based on neural networks or based on trial and error.

In certain embodiments, the processing of the optical interface, which can feature various surface-optical elements, is described. The use of such a modifiable surface-optical element in an optical module and its internal optical path are the subject of certain other embodiments.

Different particular embodiments to optimise an optical path using physically modifying, e.g. by a machining technique such as laser ablation, of an interface in this path are described below.

Figure 5:
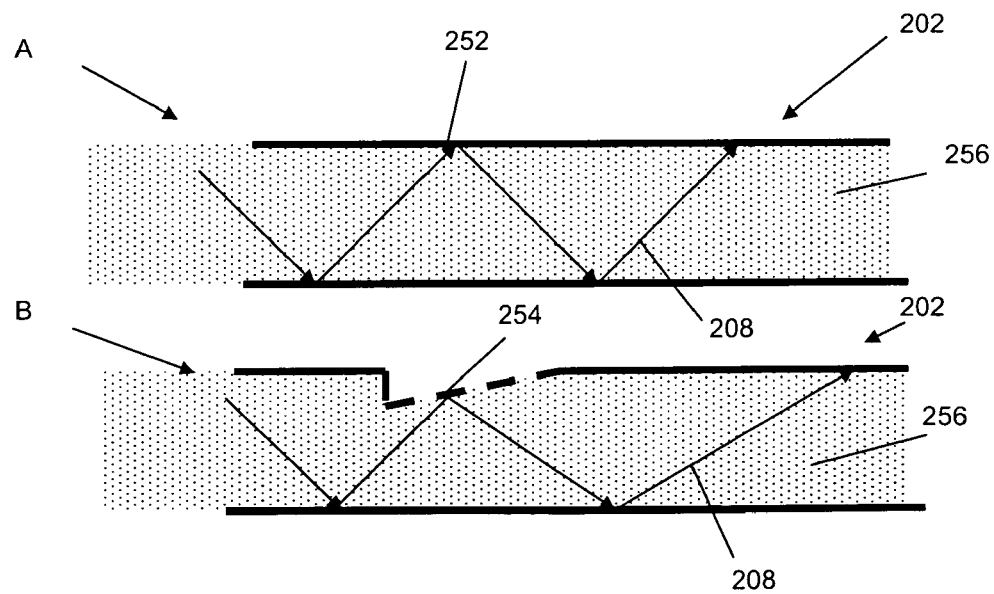
FIG. 5 illustrates laser ablation of a surface to change its inclination and position to adjust direction (primarily inclination) and/or position of a reflected beam.
Figure 6:
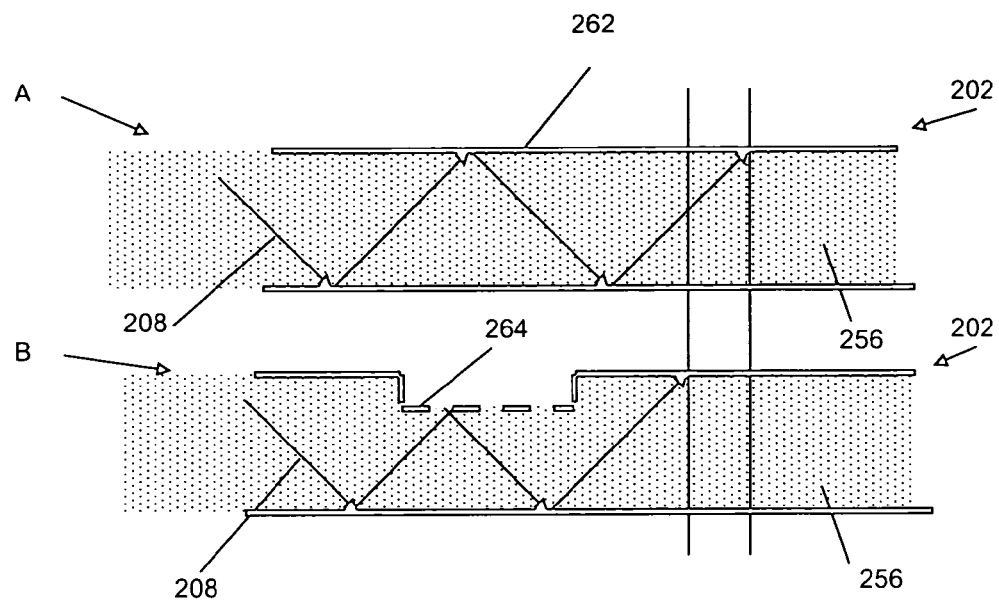
FIG. 6 illustrates homogeneous laser ablation of a surface to adjust a position of the reflected beam whereby ablation occurs from the top side.
Figure 7:
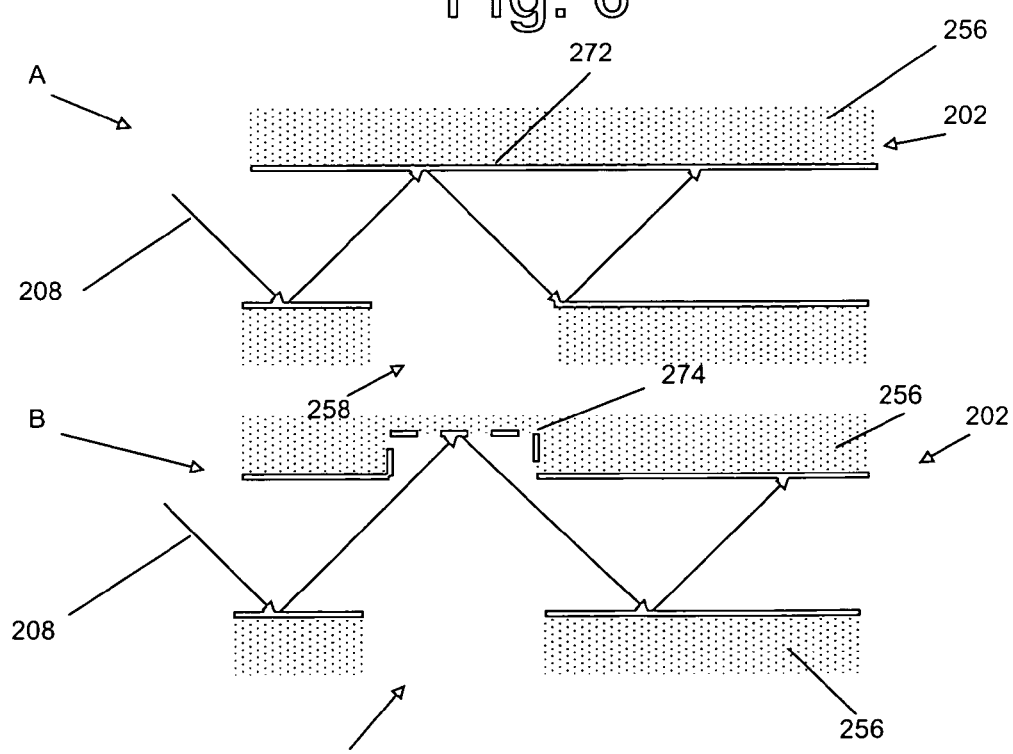
FIG. 7 illustrates homogeneous laser ablation of a surface to adjust position of the reflected beam. Ablation occurs from bottom side (ablation beam comes from below).
Figure 8:
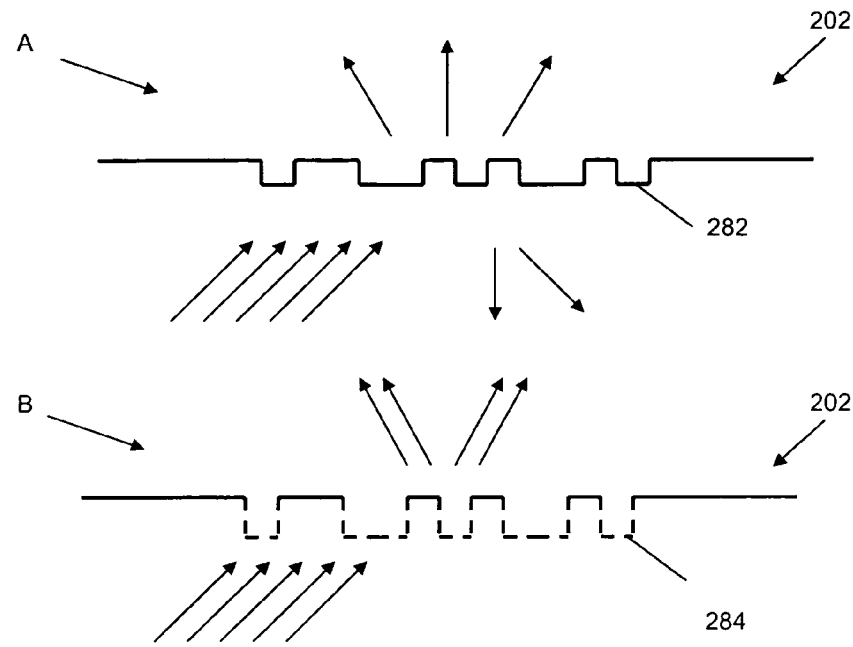
FIG. 8 illustrates ablation of diffractive lens or grating whereby the depth of the structure is increased using an ablation beam incident from the top side.

In a first particular embodiment, a method as described above is disclosed, wherein in a first exemplary possibility, a planar interface 252 being part of an modifiable element 202 on an optical path 208 of an optical module 200 can be transformed into a planar interface 254 having another angle with respect to the optical path 208 of the radiation beam. In this way changing the direction of the reflected beam may occur. The latter is shown in FIG. 5, indicating in part A the modifiable element with non-modified optical interface 252, and in FIG. 5b the modifiable element 202 with modified optical interface 254. In this case both the direction and the exact location of the radiation beam in the material 256 of the modifiable element 202 are different. Alternatively in a second exemplary possibility, a planar interface 262 is transformed into another, parallel, planar interface 264 that lies a small distance deeper into the material 256 of the modifiable optical element 202. The modifiable optical component 202 for both situations is shown in FIG. 6, illustrating the optical element 202 with non-modified interface in part A, while the optical element 204 with modified interface is shown in part B. This action, i.e. such a physical modification, shifts a radiation beam, e.g. reflected on the interface, to a parallel but shifted optical path 208. The optical path 208 of the present example typically is an optical path through transparent material 256 of the modifiable optical element, with the said interfaces 262, 264 acting as mirrors. Such mirrors may e.g. be obtained by metallisation of the interfaces, or a total internal reflection principle may be applied. An alternative illustration of the present example shows a similar modification, but wherein the modification is performed at an inner interface of the modifiable optical component 202. The latter is illustrated in FIG. 7. Again the non-modified element is shown in part A, whereas the modified element is shown in part B. A planar interface 272 is transformed into another parallel planar interface 274 that lies deeper into the material 256. This action shifts a reflecting light beam to a parallel but shifted path. The optical path lies in air or vacuum with the surfaces 272, 274 of said material 256 acting as mirrors after metallization, see FIG. 7. To allow e.g. an optical machining technique such as laser ablation while the two plates of FIG. 7 are already mounted in respect to each other, a transparent window for the laser ablation, may be defined, e.g. in the lower plate of the modifiable optical element 202. This allows the laser ablation radiation to reach the correct location. More generally, it can be seen that typically, e.g. for in-situ physical modification, a free access to the interface is provided, indicated by arrow 258. The illustrations of the present example illustrate a method wherein by physically modifying the optical path 208 is adapted such that only the exact location of the radiation beam is changed but its direction remains the same. In a third exemplary possibility, as shown in FIG. 8, no transmitting or refractive element is shown as modifiable optical element, but the modifiable optical element is an already existing diffractive optical element that is physically altered. The diffractive optical element may be transformed into a more accurate and/or more efficient diffractive optical element 202 than the non-modified diffractive optical element 202, e.g. in a modified diffractive optical element 202 having an increased diffraction efficiency. As in the other embodiments, physically modifying may e.g. be done by means of a machining technique such as laser ablation. The diffractive element 202 can be part of an optical radiation path both in a reflecting or in a transmitting way. In FIG. 8 the reflective mode is illustrated, wherein the interface 282 is shown for a non-modified element in part A and the modified interface 284 is shown for a modified element in part B. When used in reflection mode, the examples described in the first particular embodiment, can benefit from a metal layer applied after displacement of the interface, to increase the reflection, and make it less polarization-dependent. The latter can e.g. be performed by covering all parts that need no reflective material with an intermediate cover, such as e.g. adhesive tape or a layer of resist or another medium protecting these parts from being directly covered with reflective material. The intermediate cover is then removed after the reflective material deposition. Typically, this metallisation can only be applied after the ablation because the interface to be altered needs to be accessible for the physical modification, e.g. by the ablation laser beam. The existing optical path 208, which is optimized, preferably may be approximately the same with or without the metal layer. To guarantee this, typically the reflection at the uncoated interface may be such that total internal reflection occurs. Without total internal reflection, most of the radiation typically may follow a different path and result in stray light and consequently in low powers in the desired optical path 208. In the above and all other embodiments, such conditions may be taken into account while designing the optical path 208. It is to be noted that, as total internal reflection can only occur upon reflection at an interface with a smaller refractive index than the material in which the light beam resides, this design condition can not be set in the situation shown in FIG. 7.

Figures 9A, 9B:
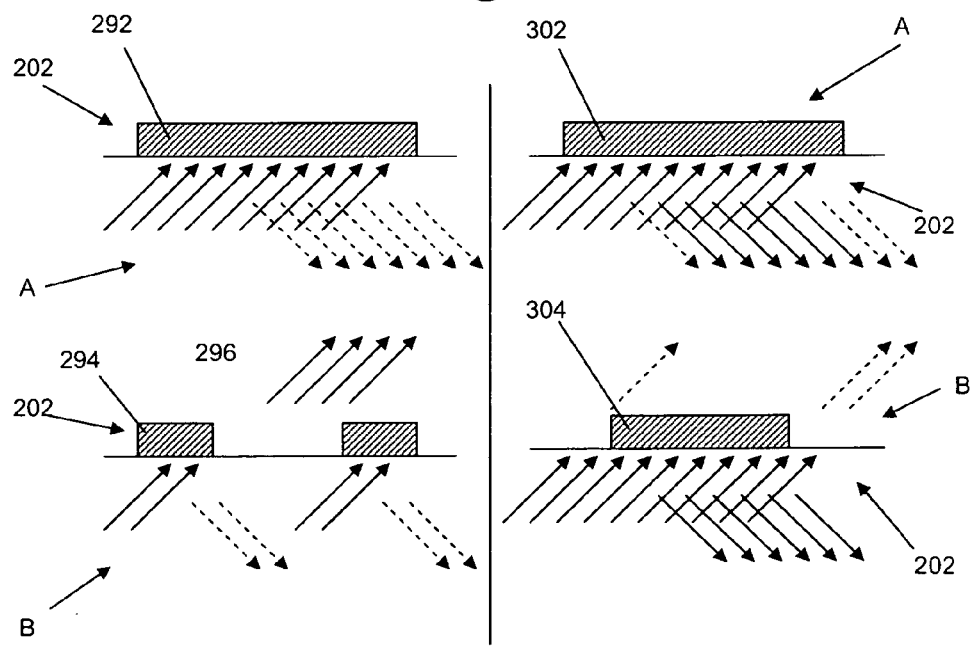
FIG. 9 illustrates ablation of reflective metal layer for definition of (reflective) apertures.
Figure 10:
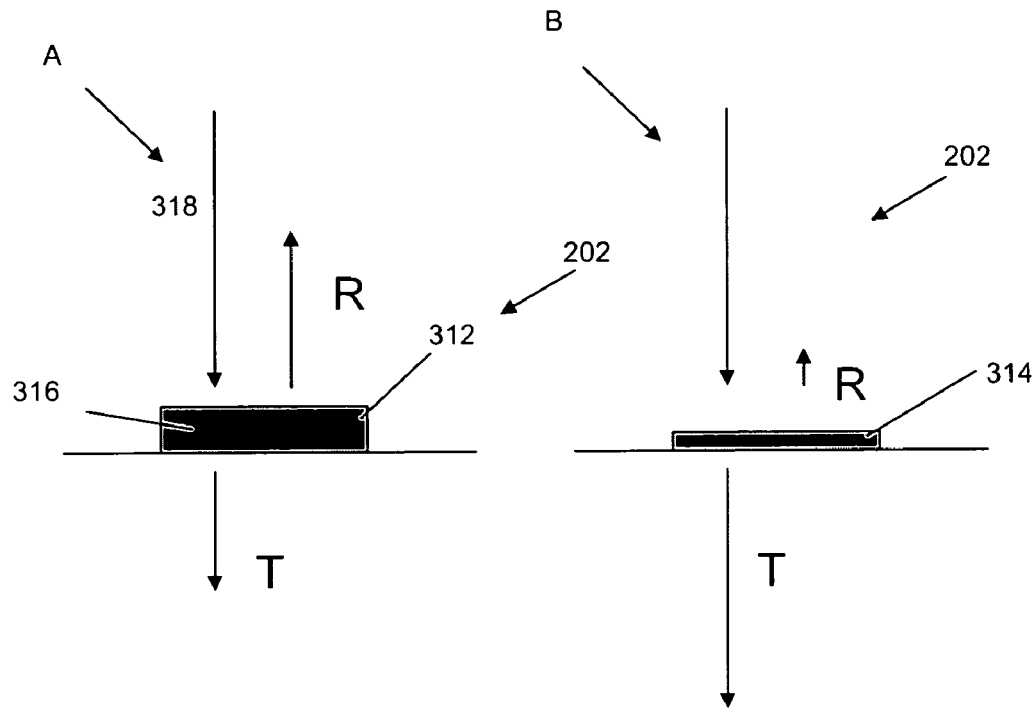
FIG. 10 illustrates changing reflected and transmitted part of a light beam by changing the thickness of an absorbing layer by laser ablation.

In a second particular embodiment, a method according to the above description is provided, wherein physically modifying at least one interface comprises removing absorbing or reflecting material in order to alter the optical path. In a first example, by locally removing a reflective layer, e.g. metal layer or reflective dielectric stack, acting together with the underlying interface as a mirror, an optical aperture can be defined, or an existing aperture can be optimised relative to other optical elements. The latter is illustrated in FIG. 9a and FIG. 9b, whereby FIG. 9a shows the creation of an aperture, while FIG. 9b shows the fine-tuning of an existing aperture In FIG. 9a, the reflective layer, e.g. metal layer 292, is altered to layer 294 by providing an aperture 296 in the reflective layer. The non-modified and modified optical element 202 is shown in part A and part B respectively. In FIG. 9b, a reflective aperture 302 is modified to a different reflective aperture 304. The latter is shown for a non-modified optical element 202 in part A and for a modified optical element 202 in part B. In a second example, as shown in FIG. 10, a method is shown wherein by physically modifying the transmissive, reflective and absorbance properties of an modifiable element are altered. The situation is shown for a non-modified optical element 202 in part A and for a modified optical element 202 in part B. A planar interface 312 of an absorbing and/or reflecting and/or transmitting material 316 is transformed into another parallel planar interface 314 that lies a small distance deeper into the material. Physically modifying the surface may comprise thinning of the layer such that another position of the interface is obtained. Furthermore, this has a direct impact on the transmission and reflection properties of the interface, by a change in reflectance R, as indicated by the change in amplitude for arrow R, or transmittance, as indicated by the amplitude for arrow T, for an incoming beam having an amplitude represented by the arrow 318. The layer being thinned can be e.g. a diffuser, with the thinning resulting in the transmitted beam being less diffused. The layer being thinned can be e.g. a (diffuse) color filter, with the thinning resulting in a more powerful transmitted beam. The layer being thinned can be e.g. a (distributed) absorber, with the thinning resulting in a more powerful transmitted beam.

Figure 11:
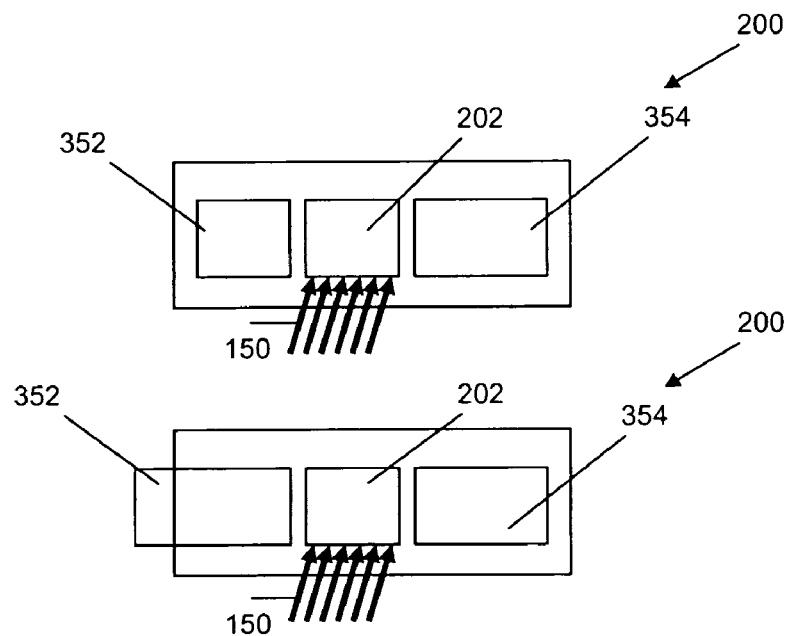
FIG. 11 illustrates the trimming concept can be changing or trimming the radiation path in an optical module. The source can be within the module (VCSEL, EEL, LED) or external (light enters via a slit, optical fiber, etc.).
Figure 12:
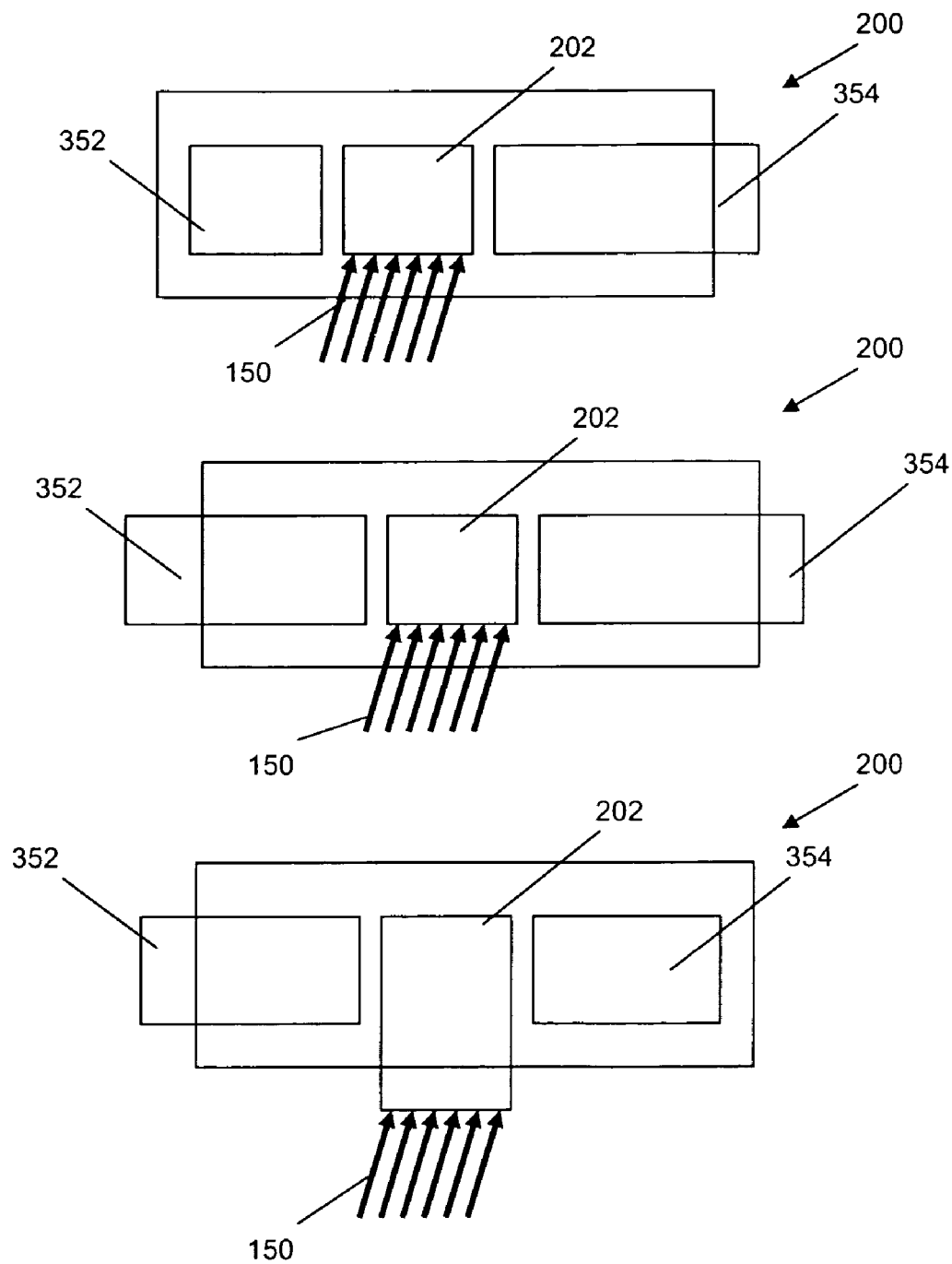
FIG. 12 illustrates the trimming concept is about changing or trimming the radiation path in an optical module. The source, destination ('sink') and/or path can be within the module or external.

In a third particular embodiment, a method is presented as described above, possibly including any of the above described particular embodiments, wherein physically modifying at least one of the optical interfaces of an modifiable optical element present on the radiation path in the optical module is applied in the construction of an optical module, i.e. in situ. The latter principle is also illustrated in FIG. 2. The optical module typically incorporates an optical entrance, which may be a slit, an optical fiber or fiber array, a pinhole, a connector for an optical fiber or fiber array, or an internal radiation emitting element. The generation of the radiation thus may be performed external to the optical module 200, i.e. the radiation does not need to originate from within the optical module 200, or it may be performed internally, meaning that the light originates from within the optical module 200, as from an LED, a VCSEL, a LED or VCSEL array, or other elements. The module also incorporates an optical sink, which can transport the light outside of the module, like an optical fiber or fiber array, a connector for an optical fiber or fiber array, or a radiation detecting element for detecting the radiation inside the optical module 200. The modifiable optical element for which at least one interface is physically modified, also referred to as the surface-optical element being trimmed, in certain embodiments is positioned on the optical path of the optical module. The latter implies that it guides a radiation beam between the optical entrance and the optical sink of the optical module. Various possibilities for the arrangement of the optical entrance 352 and optical exit 354 are shown in FIG. 11 and FIG. 12.

In the initial assembly or optical module 200, the optical path 208 between the optical entrance 352, the modifiable optical element 202 and the optical sink 354 can be seriously misaligned, e.g. relative to the position of the optical sink 354. This misalignment error is then sensed by the optical sink 354 of the module and the sensed error is used in an optical feedback, meaning that the response of the optical sink 354 is used to control the physical modifying means, e.g. by movement of the laser ablation means, thereby steering the physically modifying, e.g. trimming, of the modifiable optical element 202. The goal is to improve the coupling from the optical entrance 352 to the optical sink 354 within the optical module 200 and lowering the error to a sufficiently small value. The optical path 208 can incorporate more optical elements 206 that the one being trimmed, or multiple optical elements and interfaces to be trimmed. The initial optical path 208 is preferably designed according to the design rules as described above.

Figure 13:
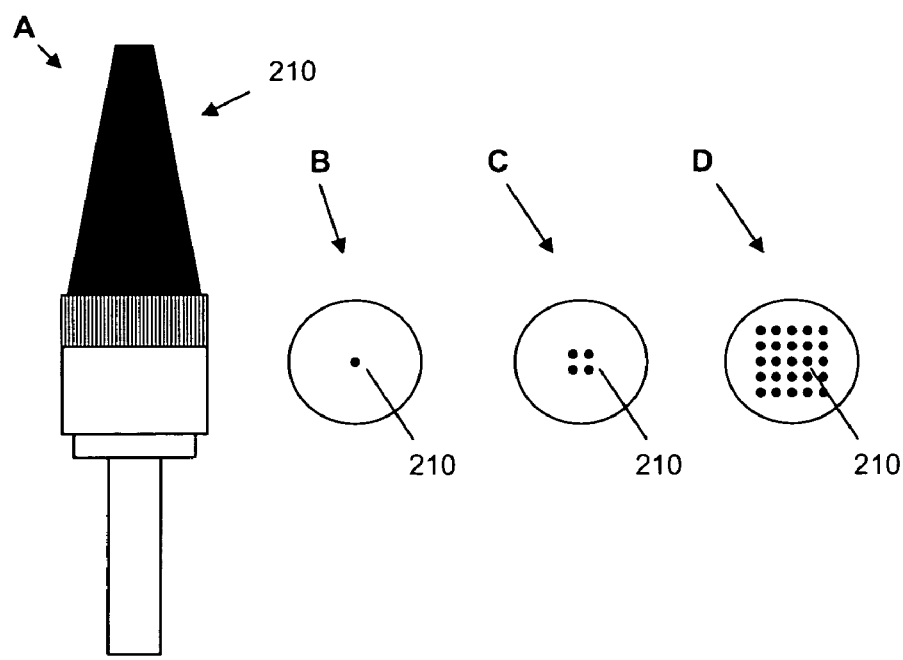
FIG. 13 illustrates a mastertool with fiber ferrule compatible housing.

In the case of an external optical sink 354, this part can during physical modification of the modifiable optical element be equipped with a master tool, being an optical detection element 212. This makes it possible to sense the error or to measure the error accurately. Such an optical detection element may be any suitable optical detection element 212, such as e.g. a photodetector, a photodiode or array thereof, a multiple pixel detector, etc. At the optical entrance radiation generating means may be positioned for generating a radiation beam. This may be an optical emission element such as e.g. a radiation generating device positioned in an existing fiber connector. Some examples, the invention not being limited thereto, may be a single radiation generating device 374 in an optical fiber in a ferrule, an optical fiber with a ferrule that can generate several radiation generating devices 374 localized at different places in the facet of the ferrule. Such an optical emission element 210, also referred to as an entry master tool, is illustrated by way of example in FIG. 13. Part A shows a side view of an optical fiber with a single radiation generating device, and part B, C and D of FIG. 13 indicate horizontal cross sections of ferrules with respectively one, four and 25 radiation generating devices 374. By switching on various individual light spots in the ferrule and recording the response in the sensing part of the module, the error of the existing optical path can not only be quantified but the direction of the beam misalignment may also be known. More generally, it is advantageous to have an optical emission element 210 wherein a number of different spatially distributed radiation generating devices 374 may be used, as the latter allows derivation of the direction of the beam misalignment. Knowing the direction of the misalignment error in the optical path may enable a more appropriate physical modification of the at least one interface of the modifiable optical element 202 described in the above embodiments. Without the master tool, only the amount of misalignment of the optical path can be recorded but not the direction of the misalignment. In the same way a sensing master tool can be defined if the sensing part of the optical module is external. If the external sensing part is in the form of a fiber connector then the reverse master tool of FIG. 13 forms the sensing master tool. Instead of light generating spots at the end facet of a fiber ferrule, there will now be light-detecting spots at the end facet of this ferrule.

By way of illustration, the present invention not being limited thereto, a number of examples will be provided illustrating possibilities and advantages of particular embodiments according to the present invention. These examples should be seen as clarifications of the above laid out principles and not limiting to the scope of the present invention.

Figure 14:
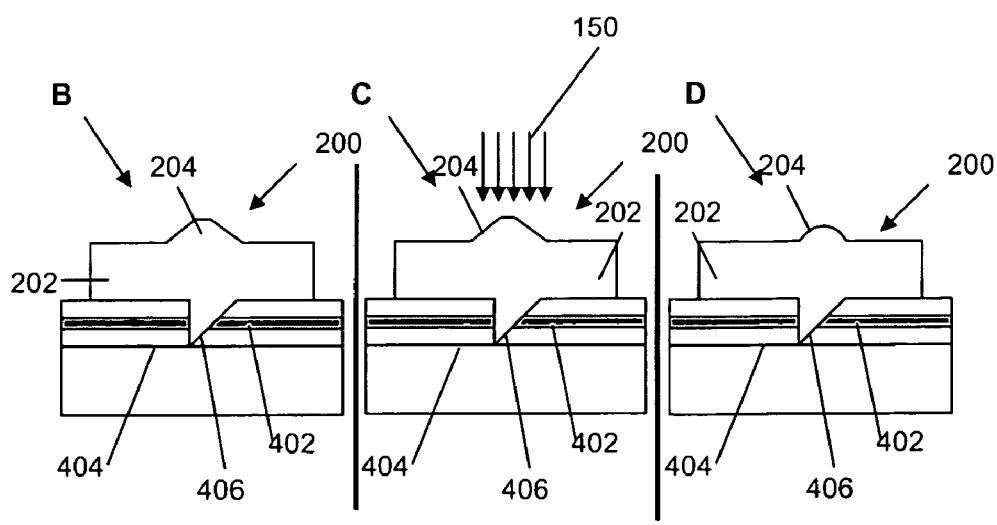
FIG. 14 illustrates laser ablation is used to shape or trim the initial inaccurate optical part into a precise optical part.

In a first example, a connector for polymeric optical waveguide structures is described. The optical module 200 comprises an optical waveguide 402 inside a substrate 404, an oblique mirror facet 406 and a lens 408 and is shown in more detail in FIG. 14. Such a setup, comprising these components, is described in more detail in International patent application WO 96/07117. Such an optical module 200, i.e. the connector for polymeric optical waveguide structures, can advantageously be optimised using methods described herein e.g. as physically modifying the surface 204 of the lens 408, i.e. the modifiable optical element 202, may allow steering of incoming or outgoing light beams onto the desired location. Different steps of the optimisation, i.e. the provision of an optimised optical path, are illustrated in parts A, B and C of FIG. 14. In part A of FIG. 14 the rough optical module 200, being the connector for polymeric optical waveguide structures as described in International patent application WO 96/07117, is shown. In part B, the physical modification of the interface 204 of the modifiable optical element 202, i.e. in the present example by laser ablation, is schematically depicted. The latter typically may result in a lens shape that accurately couples the light exciting the optical waveguide 402 into the perpendicular direction.

Figure 15:
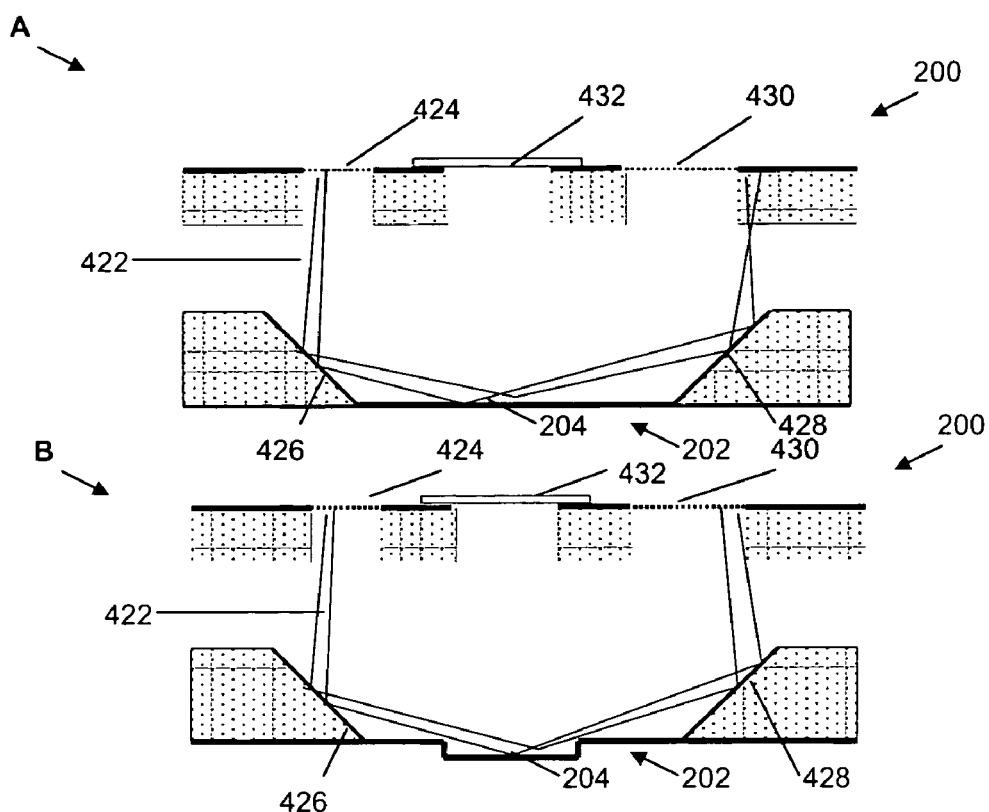
FIG. 15 illustrates calibration of the component by laser ablation of the lower reflective surface for beam adjustment.

In a second example, an optical module for infrared radiation is described. Typically, most substances absorb infrared (IR) radiation with wavelengths longer than a few micrometers. Consequently, typically an optical module using IR radiation with these wavelengths therefore needs an optical path that lies in free space, i.e. that lies in a gaseous environment, in air or in vacuum. Typically, such optical modules comprise an optical element that is a reflective element allowing redirection of IR radiation coming from a gaseous environment, air or vacuum and redirects it again to a gaseous environment, air or vacuum. This optical element may be a modifiable optical element comprising at least one optical interface that may be physically modified such as e.g. trimmed. As the modifiable optical element is at the inside of the IR module, a free access, e.g. through a transparent window transparent for ablation radiation typically is provided in the assembly of the module. An example of a module based on this principle is shown in FIG. 15. In the optical module 200 as shown in FIG. 15, IR radiation 422 enters via a grating 424 dispersing it according to the wavelength. An oblique surface 426 redirects the light towards a reflective bottom plane surface, acting as an interface of a modifiable optical element 202, where it reflects towards another, e.g symmetrically placed oblique plane surface 428 and finally towards a detector array 430. By physically modifying the reflective bottom plane surface, i.e. the interface 204 of the modifiable optical component 202, such that the bottom mirror lies deeper into the substrate, the optical path of the light rays can be changed. The free access 432, in this example the ablation window, is also shown. In part A of FIG. 15 the non-modified optical module is indicated whereas in part B of FIG. 15 the modified optical module is indicated. The latter thus offers a way to adjust, adapt, fine tune or calibrate this modifiable optical component 202 after assembly of the optical module 200.

Figure 16:
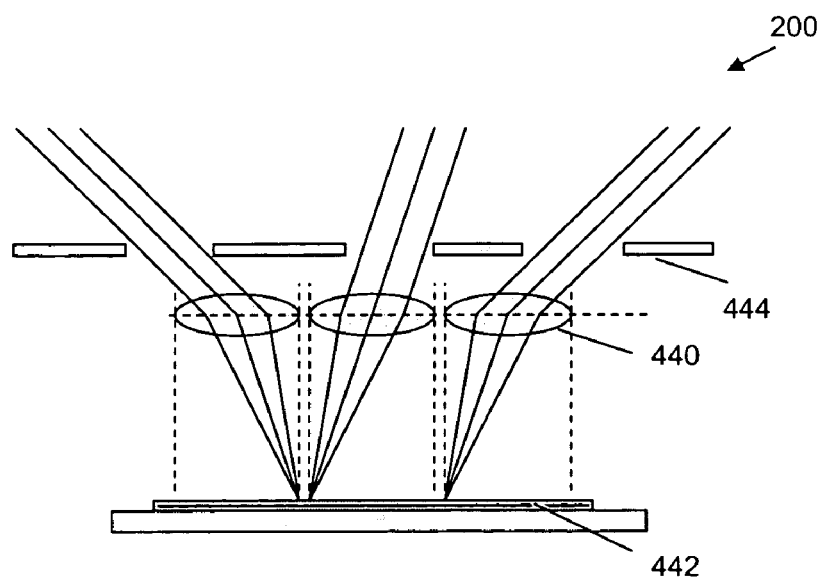
FIG. 16 is an illustration of the multi-facet camera.

A third example describes a multi-facet camera. To make more compact cameras, numerous configurations have been proposed in which a lens array is used instead of a single lens. By way of example such a multi-facet camera is shown in FIG. 16, indicating an optical module 200 wherein every lens 440 focuses a certain portion of the sphere imaged with the camera onto its underlying pixel 442. The pixels 442 are part of a camera chip that typically may be a CMOS-device, a charge coupled device (CCD), or other device capable of registering an image. Typically such cameras suffer from crosstalk as in such configuration light can pass between the lenses and arrive at a different pixel from the pixel underneath the lens. By covering the lens array with a light absorbing or reflecting material 444, such as e.g. metal, and only opening up this material 444, e.g. metal, in a controlled way using physical modification of the interface of the optical component, each lens is provided with an aperture which can be used to reduce the angle of incident light on the lens and in this way, lower the crosstalk and additionally compensate for a possible misalignment between lenses 440 and the pixels 442 of the pixel array.

Figure 17:
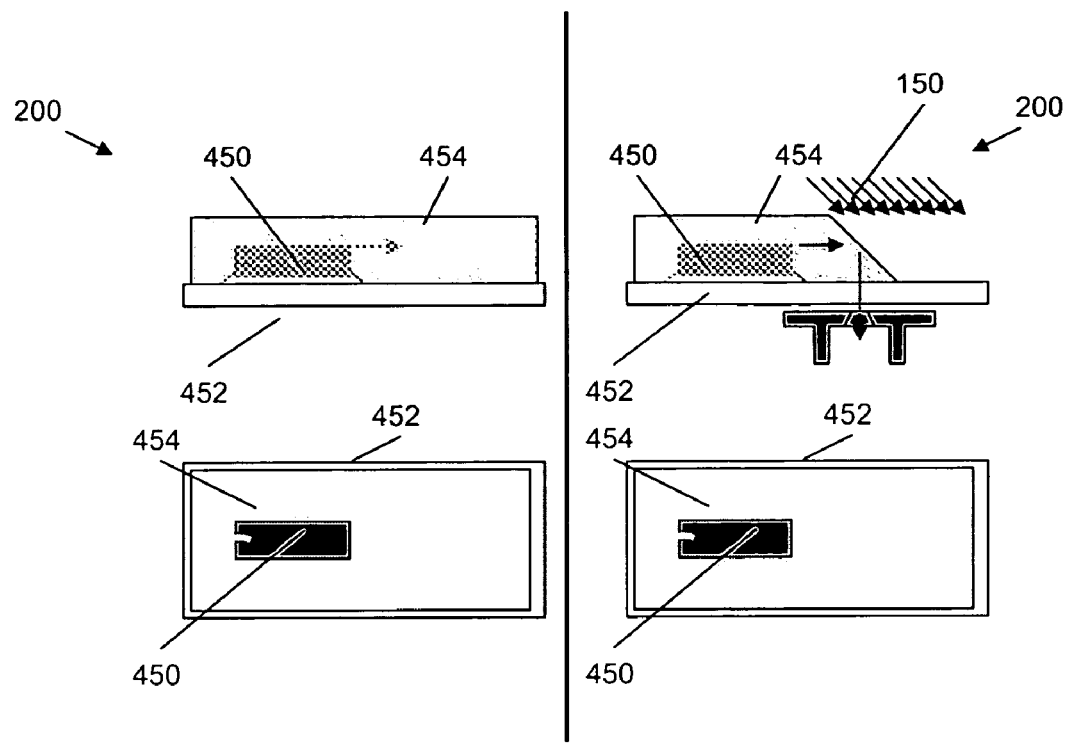
FIG. 17 illustrates an optical module comprising a light source and a fiber which can be pluggable.
Figure 18:
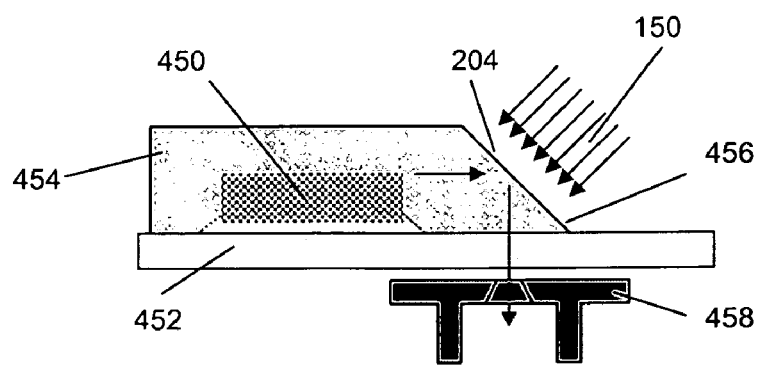
FIG. 18 illustrates mirror angle and surface curvature can be adjusted by laser ablation to optimize coupling efficiency from source to fiber. Initially a 45-degrees facet can be made by laser or via micromolding. Trimming afterwards can be done by laser ablation.
Figure 19:
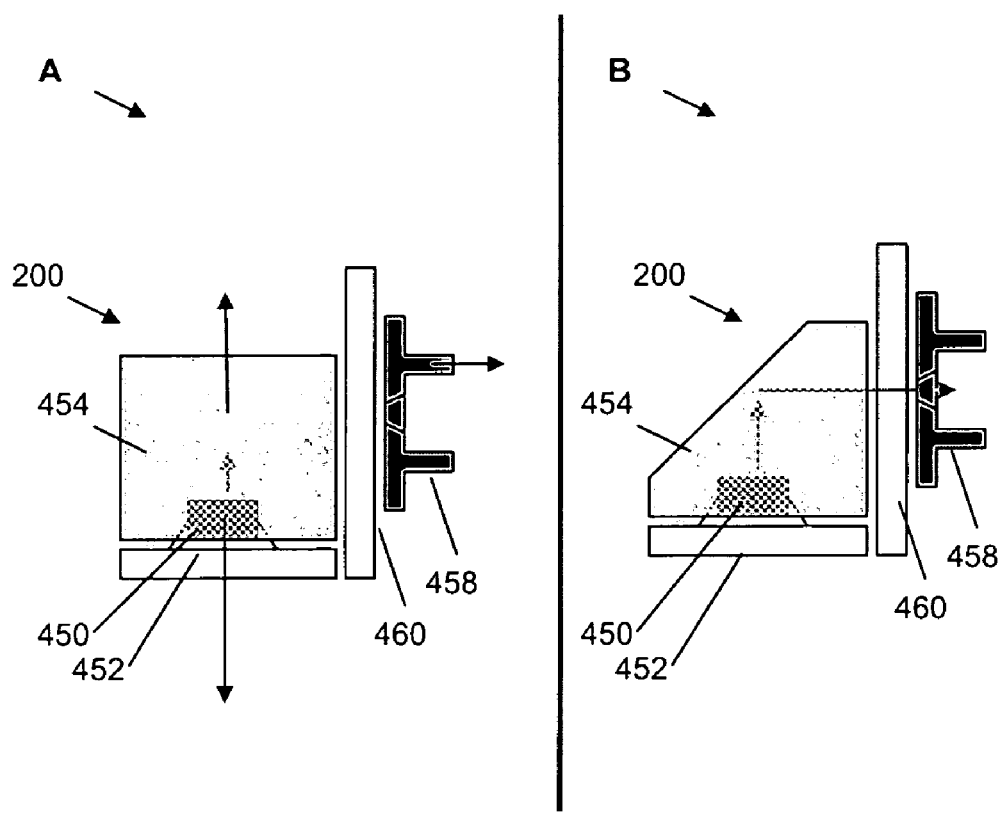
FIG. 19 and FIG. 20 illustrate a similar process as described in FIG. 17 and 18 for the packaging of a surface-emitting light source and a fiber acceptor into an optical module.
Figure 20:
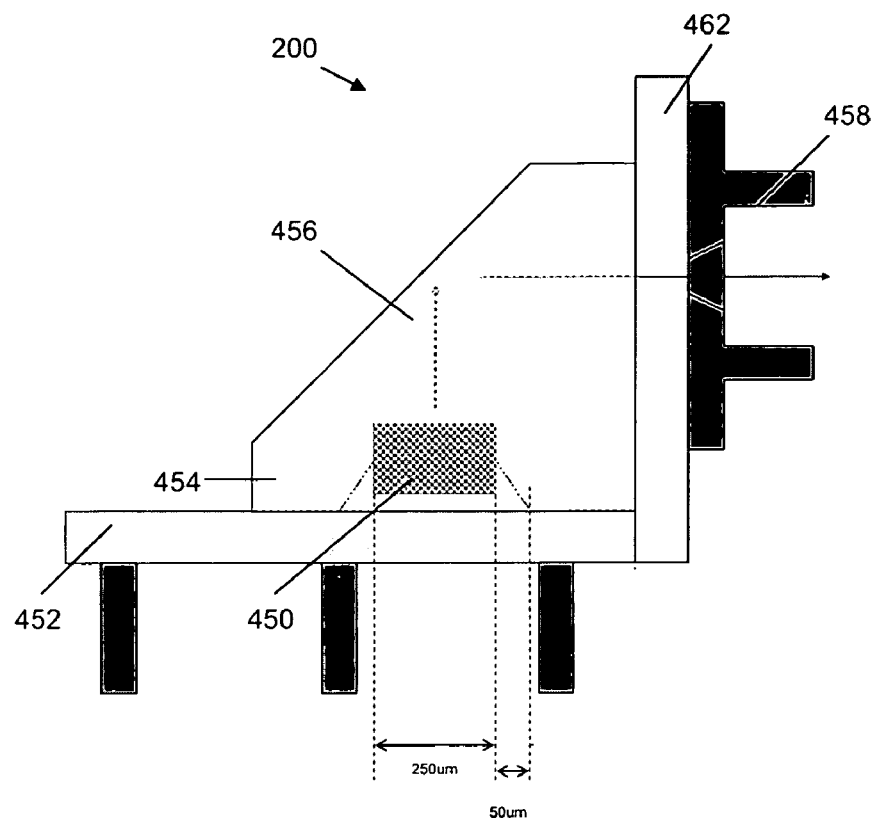
Figure 21:
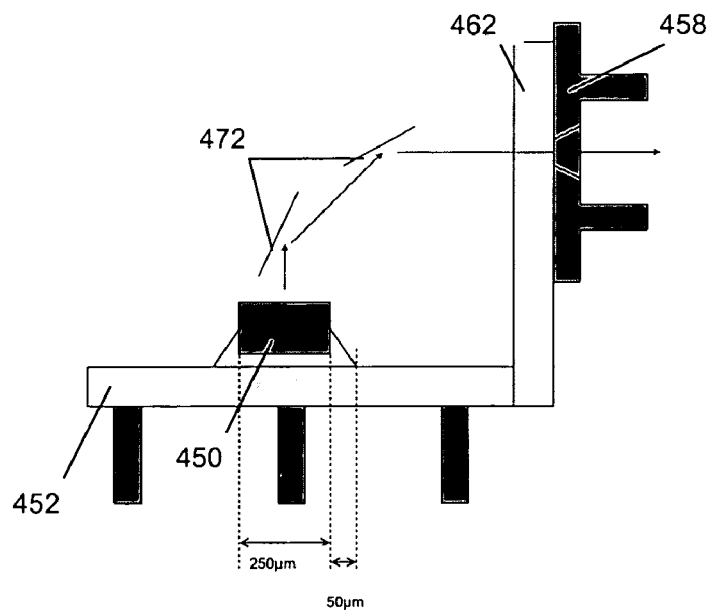
FIG. 21 illustrates an embodiment in which a two-step mirroring is applied.

A fourth example describes an optical module containing a light source and a fiber connector which is pluggable. The alignment between the connector and the light source should be very accurate to guarantee an efficient radiation path between the source and the fiber. Two configurations are shown: one using edge-emitting light sources and one using surface-emitting light sources. FIG. 17 and 18 show the process for the packaging of edge-emitting light sources. In FIG. 17 part A, a side view (above) and top view (below) is shown of a non-modified optical module, whereas in FIG. 17 part B a side view (above) and top view (below) is shown of an optical module with manufactured optical element, i.e. inclined mirror. In FIG. 18, the corresponding optical module is shown wherein modifying of the optical element, here the inclined mirror, is indicated. In the optical module 200 shown in FIG. 17 part A, the light source 450 is mounted onto a substrate or carrier 452 and is afterwards covered with a transparent compound 454 having the right properties to be micro-machined, e.g. with an optical machining technique such as laser ablation. In the present example, the substrate may typically have a thickness of about 500 μm and the transparent compound 454 typically may have a thickness between 500 μm and 1000 μm, although the invention is not limited thereto. An initial 45 degree inclined facet, i.e. the inclined mirror 456 corresponding with the modifiable optical element 202 having a modifiable interface 204, is formed into the transparent compound 454, and the acceptor part of the fiber connector 456 is mounted at the other side of the substrate 452, as indicated in part B of FIG. 17. The step of physically modifying, e.g. trimming, is applied to correct the initial radiation path between the source 450 and the fiber acceptor 458 formed by the inclined facet, i.e. inclined mirror 456 with modifiable surface 456. The writing, i.e. initial manufacturing or initial ablation, of such an optical element, typically also referred to as slow lens, can be part of the modifying process. In FIG. 19 a similar process for the packaging of a surface-emitting light source and a fiber acceptor into an optical module is shown. FIG. 19 part A indicates the optical module without manufactured optical element, FIG. 19 part B indicates the optical module with manufactured inclined mirror, i.e. modifiable optical component and FIG. 20 indicates the optical module with physically modified mirror, i.e. physically modified modifiable optical component. In the optical component 200 again the source 450 is mounted onto a substrate 452, but this substrate 452 is now perpendicularly attached to another substrate 460 carrying the fiber acceptor 458. The light source 450 is covered with a transparent compound 454 and a 45 degree inclined facet is formed, again forming an initial radiation path, to be optimized using a method for physically modifying an interface of a modifiable component. If the refractive index of the transparent compound 454 is not high enough to allow for total internal reflection under angles around 45 degree, a two-step mirror 472 as in FIG. 21 may be applied. Instead of a single reflection less than 45 degrees, two reflection surfaces under larger angles of incidence are then provided to guide the light between the surface-emitting light source 450 and the perpendicularly mounted fiber acceptor 458. In the present example, a typical dimension for the width of the light source 450 may be 250 μm mounted on the substrate 452 using a fixing means extending 50 μm besides the light source 450 at each side on the substrate 452, although the invention is not limited thereto.

Figure 22:
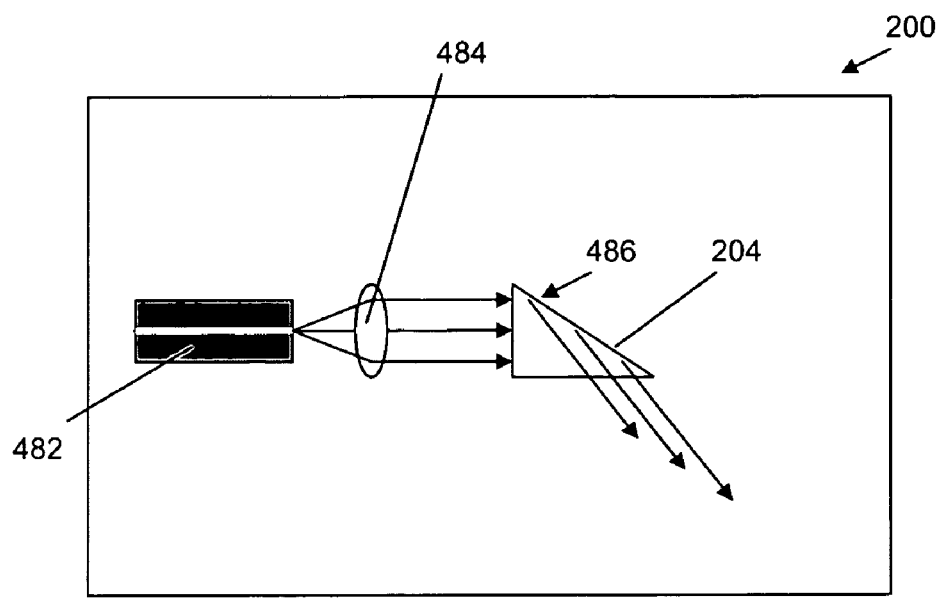
FIG. 22 illustrates trimming to obtain a polarized light beam.

In a fifth example, it is illustrated that the polarization-dependent behaviour of reflection of a light beam at an interface can be used to control the polarization of a light beam. The latter is indicated in FIG. 22 indicating a method for generating polarised light in an optical module 200, wherein a light source 482, e.g. laser, is guided by a lens element 484 on a reflecting element 486, corresponding with the modifiable optical element 202 having a modifiable optical interface 204. It is known that by reflecting the beam at angles around the Brewster angle, the reflected light beam can become linearly polarized. The physically modifying process as used herein thus also may be used for generating a polarisation selecting means, e.g. the physically modifying process, such as a trimming process, may be applied to give the reflecting facet the Brewster angle to fine tune the angle of a reflecting element 486, e.g. of a polarisation selective element.

Figure 23:
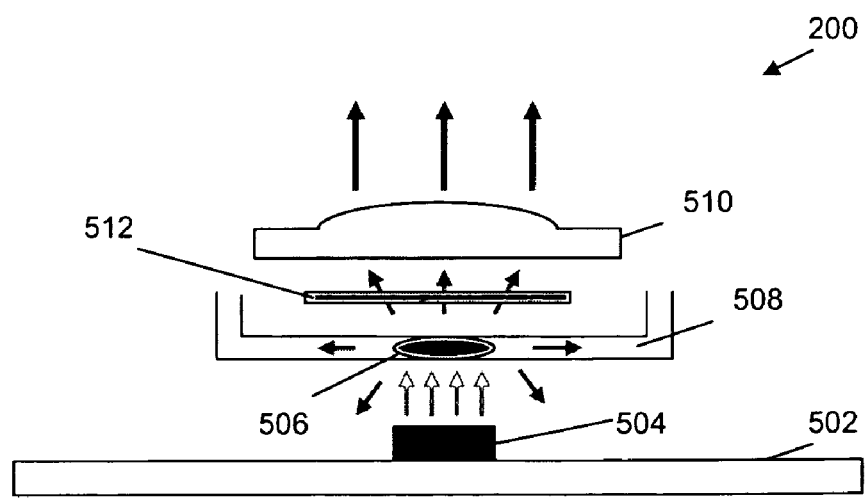
FIG. 23 illustrates fluorescence read-out.

In a sixth example, a fluorescence read out is described. The methods for providing a predetermined radiation path in the present example are used to optimise a fluorescence emission path, as shown in FIG. 23. An optical module 200 is shown, comprising a substrate 502 with excitation light source 504 adapted for exciting fluorescent material 506 provided in a sample container 508. After excitation of the fluorescent material 506, the fluorescence radiation typically is guided towards a detector surface, using an optical element 510, e.g. lens. In the present example, the optical element 510 for guiding the fluorescence light is fine tuned by physically modifying its surface in order to have efficient detection of the fluorescence radiation. The optical module 200 preferably also comprises a filter 512 for filtering the excitation light in order to avoid erroneous measurements or saturation of the detector due to detection of the excitation light.

Figure 24:
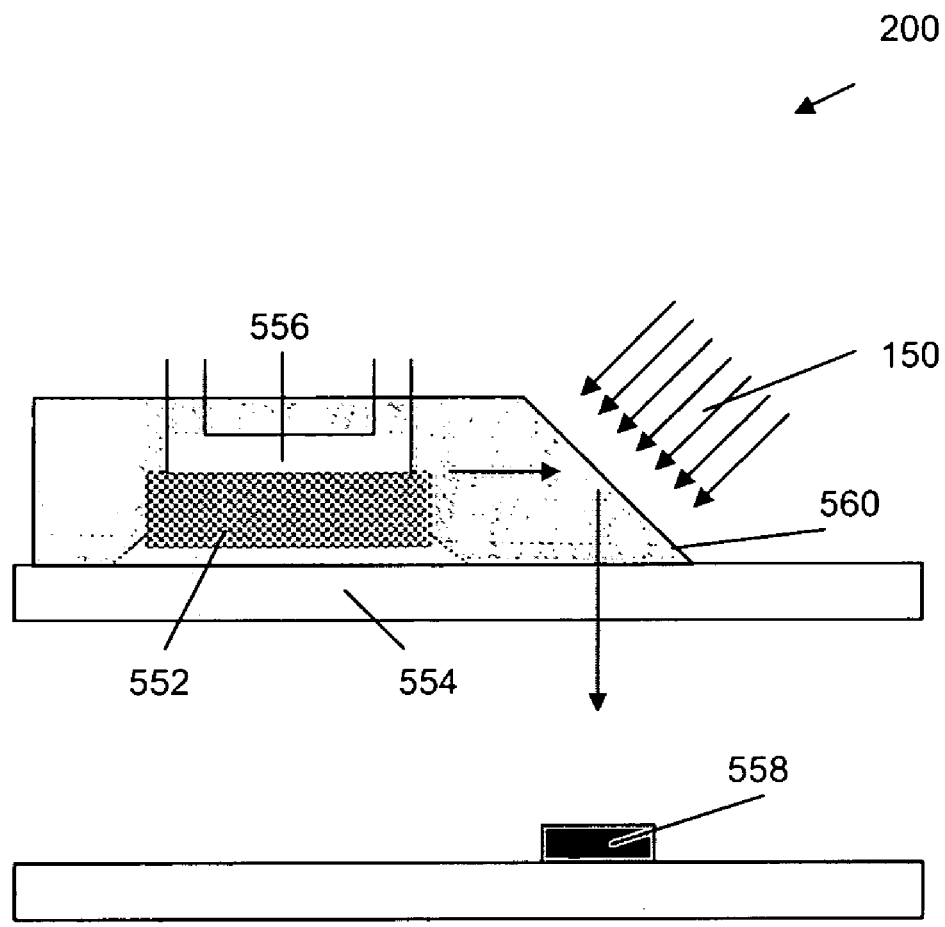
FIG. 24 illustrates a biosensor interface.

In a seventh example, a biosensor interface is described, wherein the methods for providing a predetermined radiation path are used to provide an optimal coupling from the generated optical signal from the detected material towards a detector element. The latter is illustrated in FIG. 24. An optical component 200 is shown comprising an optical radiation source 552 mounted on a substrate 554. The optical module 200 furthermore comprises a measurement reservoir 556 adapted for holding material to be analysed, such as e.g. a micro-fluid channel, although also a measurement reservoir 556 for holding solid materials may be present. The optical module 200 futhermore also is adapted for guiding generated optical signals stemming from analytes to be detected towards a detector element 558. Typically an optical element 560 such as a mirror or lens is used therefore. Providing the optical element 560 as well as fine-tuning the optical element to obtain a good coupling of the generated optical signal to the detector element 558 may be done according to any of the methods for providing a predetermined optical path as described above.

The typical cycle that may be performed for aligning in an alignment method comprises positioning of the opto-electronic and possibly also optical components on a substrate, encapsulating these and, if already present, fine-tuning the optical components or manufacturing and fine-tuning the optical components. As the optical components are fine-tuned in situ, less stringent requirements are put on the quality of the initial optical components. It thus also is possible to use standard components, and assembling these components. By providing the additional step of fine-tuning, easier and more accurate alignment can be obtained as the components are device-specific adapted for providing improved optical characteristics of the corresponding optical module. Furthermore, the time cost needed for alignment is short, i.e. in the order of seconds. Typical applications for the alignment methods described herein include edge to single mode, VCSELs, among other applications. With respect to accuracy, the alignment method described herein allows sub-micron accuracy in X-, Y- and Z-alignment. The alignment method described herein is suitable for optics and provides a large flexibility as it allows fine tuning of components for device-specific purposes.

Figure 25:
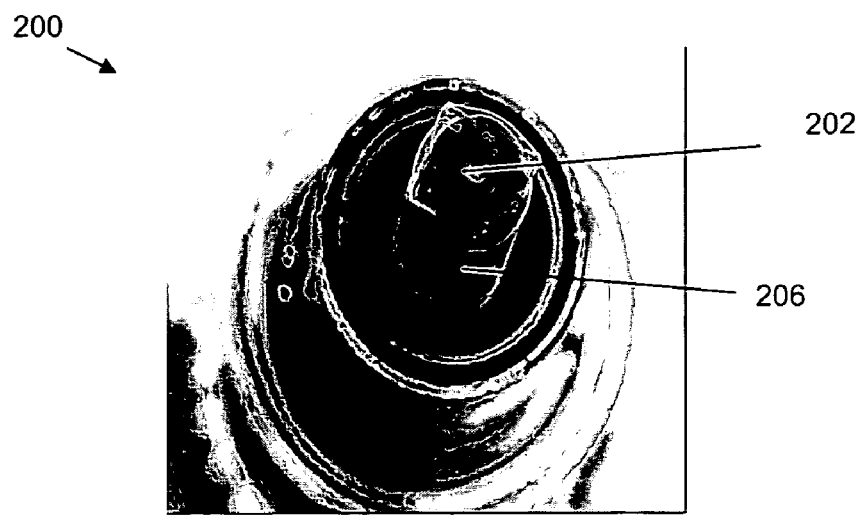
FIG. 25 is a perspective view of a lens after trimming.
Figure 26:
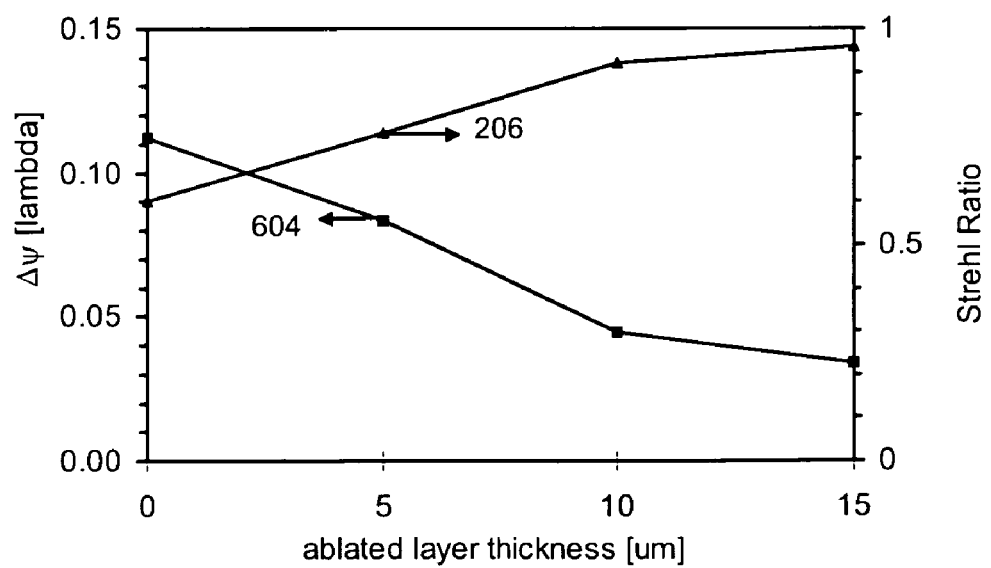
FIG. 26 is a graph illustrating properties of the lens of FIG. 26 during the trimming.
Figure 27:
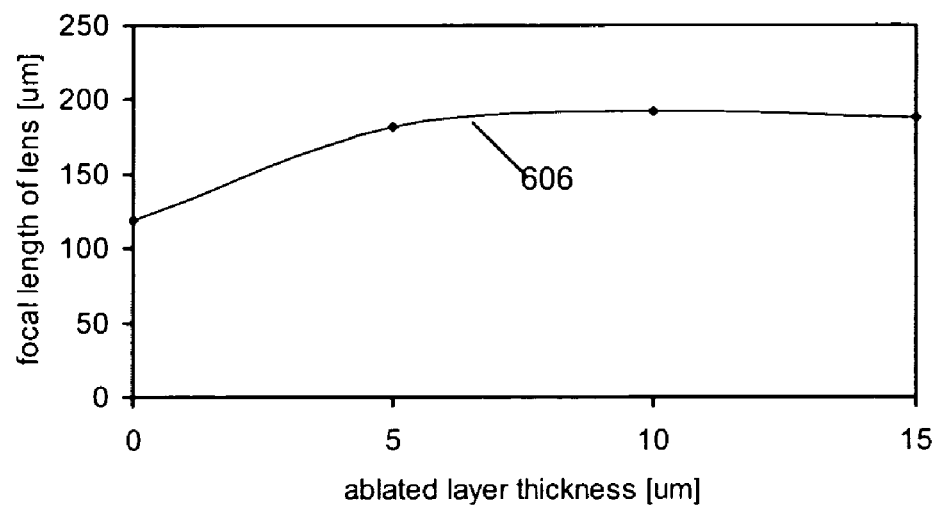
FIG. 27 is a graph illustrating the focal length of the lens of FIG. 26 during trimming.

In an additional example, the results for an exemplary experiment are provided wherein a lens on a facet of an optical fibre is physically modified. The latter is illustrated in FIG. 25 to FIG. 27. The exemplary experiment illustrates features and advantages according to embodiments of the techniques described above. Typically in order to make the optical module of the experiment, an optical fibre is obtained and a lens, here the modifiable optical element, is provided on the optical fibre facet by fixing a plastic plate to the fiber facet and creating a lens by machining such as laser ablation. In the present experiment, the lens then is physically modified, in the present experiment brought deeper in the plastic plate using laser ablation, in order to compensate for the original misalignment of the lens in the plastic plate. FIG. 25 illustrates the physically modified lens 202 positioned on the optical fibre 206 in the optical module 200. The Strehl Ratio expresses the ratio of the measured intensity to the theoretically expected intensity of an optical signal detected. In FIG. 26, the Strehl Ratio for an optical signal of a radiation beam following the optical path, i.e. running through the optical fiber and the lens, is shown as function of an ablated laser thickness in curve 602. The latter clearly indicates that the quality of the lens improves with ablating. Curve 604 indicates the angle aberration $\Delta\Psi$ in the corresponding optical system. FIG. 27 indicates in curve 606 the change of the focal length of the lens as function of the ablated layer thickness, indicating that this parameter can be tuned by physically modifying the lens interface. The above experiment indicates that adjusting the optical path of an optical module can indeed be performed and that more efficient systems, e.g. with a better coupling efficiency between components can be obtained.

An optical module is provided that typically may be adapted for or may be aligned using a method for providing a predetermined path length according to any of the methods as described above. As described above, such an optical module is illustrated by an optical module 200 as shown in FIG. 4. The optical module 200 typically is adapted for receiving an incident radiation beam from an optical emission element 210 and is adapted for providing the exiting radiation beam to an optical detection element 212, the radiation beam having followed an optical path 208 in the optical module 200. The optical module 200 typically comprises a modifiable optical element 202 positioned in the optical path 208. It furthermore is adapted for providing free access to at least one interface 204 of the modifiable optical element 202 for in-situ physical modification of the at least one interface taking into account a detected optical signal stemming from said radiation beam following the optical path 208 and detected by said optical detection element 212, so as to substantially obtain a predetermined optical path for the optical module 200 having a predetermined optical characteristic. The optical module 200 may be an opto-electronic module comprising an optical emission element 210 for generating said incident radiation optical signal and an optical detection element 212 for receiving the exiting optical signal. The present aspect thus typically may relate to optical modules as obtainable by methods as described according to the first aspect above. The optical modules according to the present aspect thus may comprise the same features and advantages of one or a combination of optical modules described in different embodiments and examples of the description of the methods for providing predetermined optical paths according to the first aspect. For example, similar optical detection elements and optical emitting elements may be provided as those used throughout the description of the first aspect. A further example is the modifiable optical element which also may be similar as the one used throughout the description of the first aspect.

Figure 28:
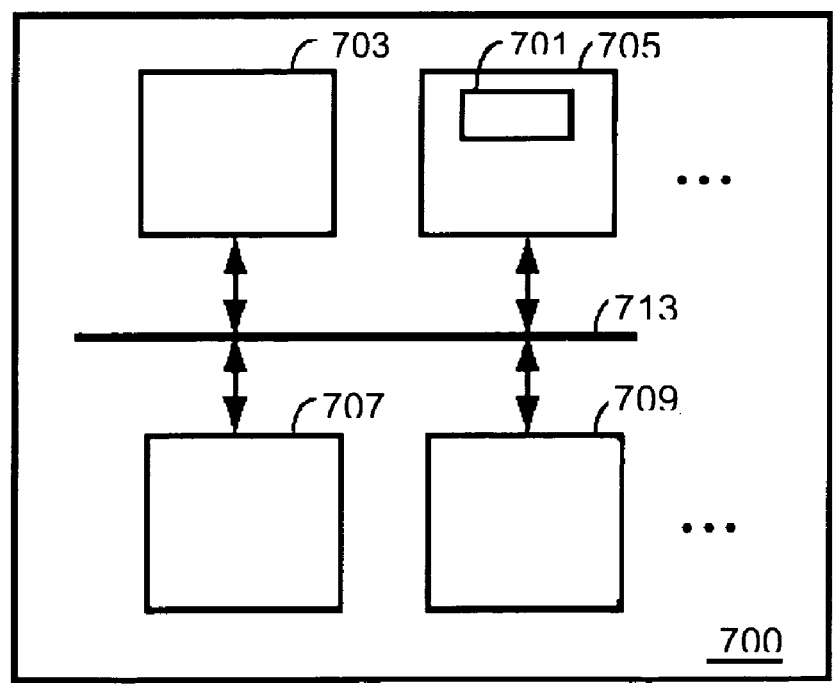
FIG. 28 is a schematic block diagram of a computer adapted to perform a method of coupling optical devices.

The above-described method embodiments may be implemented in a processing system 700 such as shown in FIG. 28. FIG. 28 shows one configuration of processing system 700 that includes at least one programmable processor 703 coupled to a memory subsystem 705 that includes at least one form of memory, e.g., RAM, ROM, and so forth. It is to be noted that the processor 703 or processors may be a general purpose, or a special purpose processor, and may be for inclusion in a device, e.g., a chip that has other components that perform other functions. Thus, one or more steps of the methods described herein can be implemented in digital electronic circuitry, or in computer hardware, firmware, software, or in combinations of them. The processing system may include a storage subsystem 707 that has at least one disk drive and/or CD-ROM drive and/or DVD drive. In some implementations, a display system, a keyboard, and a pointing device may be included as part of a user interface subsystem 709 to provide for a user to manually input information. Ports for inputting and outputting data also may be included. More elements such as network connections, interfaces to various devices, and so forth, may be included, but are not illustrated in FIG. 28. The various elements of the processing system 700 may be coupled in various ways, including via a bus subsystem 713 shown in FIG. 28 for simplicity as a single bus, but will be understood to those in the art to include a system of at least one bus. The memory of the memory subsystem 705 may at some time hold part or all (in either case shown as 711) of a set of instructions that when executed on the processing system 700 implement the steps of the method embodiments described herein. Thus, while processing systems using components analogous to those of system 700 are known in the art, a system, such as system 700 that includes the instructions to implement aspects of the methods for providing a predetermined optical path in an optical module is not known in the art.

A computer program product is also described which provides the functionality of any of the methods described above when executed on a computing device. More particularly, such a computer program product, when executed on a computing device, is adapted for performing a method to assist in providing a predetermined optical path in an optical module, the predetermined optical path being defined by predetermined optical characteristics for the optical module. The assistance provided includes receiving an optical signal representative for detection of a radiation beam that has followed the initial optical path of the optical module and determining physical modification parameters for an optical interface of a modifiable optical element in the module. The physical modification parameters take into account the received optical signal so as to obtain substantially the predetermined optical characteristics for the optical module. These parameters can be used to generate at least one modified optical interface of the modifiable optical element.

The computer program product may be adapted to provide settings for a physical modification means so as to adapt an optical interface according to the physical modification parameters. Such a computer program product can be tangibly embodied in a carrier medium carrying machine-readable code for execution by a programmable processor. The carrier medium thus carries a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

It is to be understood that although preferred embodiments, specific constructions and configurations, as well as materials, have been discussed herein, various changes or modifications in form and detail may be made without departing from the scope and spirit of this invention. For example, whereas a method has been described for providing a predetermined optical path in an optical module, the present invention also relates to a related method for manufacturing an optical module, whereby the different components constituting the optical module are provided on a substrate and wherein alignment of the components is performed using a method for providing a predetermined optical path in an optical module. Providing optical components on a substrate thereby may include obtaining a number of standard optical components and/or manufacturing a number of components and positioning the components on the substrate. The latter may be performed at predetermined positions corresponding with an initial alignment for the optical module. Other typical manufacturing steps such as packaging also may be performed.

The invention claimed is:

1. A method comprising:
   identifying a predetermined optical characteristic for an optical module;
   providing an optical module having an initial optical path, and a modifiable optical element, wherein the modifiable optical element includes an optical interface in the initial optical path, and an optical receiving part permanently positioned in the optical module;
   generating an optical signal;
   detecting the optical signal in the initial optical path through the optical receiving part; and
   irreversibly modifying the optical interface to generate a modified optical interface of the modifiable optical element, wherein the modification of the optical interface is performed in response to the detected optical signal so as to obtain substantially the predetermined optical characteristics for the optical module;
wherein the modifying is performed so as to obtain substantially an optical characteristic selected from the group consisting of: a predetermined coupling efficiency between fibres, a predetermined degree of collimation, a predetermined shape of a radiation beam obtained in the optical module, and a predetermined overlap between a radiation beam obtained in the optical module and a detector surface.

2. A method comprising:
identifying a predetermined optical characteristic for an optical module;
providing an optical module having an initial optical path, and a modifiable optical element, wherein the modifiable optical element includes an optical interface in the initial optical path, and an optical receiving part permanently positioned in the optical module;
generating an optical signal;
detecting the optical signal in the initial optical path through the optical receiving part; and
irreversibly modifying the optical interface to generate a modified optical interface of the modifiable optical element, wherein the modification of the optical interface is performed in response to the detected optical signal so as to obtain substantially the predetermined optical characteristics for the optical module;
wherein modifying comprises varying the transmission coefficient of the modifiable optical element.

3. A method comprising:
identifying a predetermined optical characteristic for an optical module;
providing an optical module having an initial optical path, and a modifiable optical element, wherein the modifiable optical element includes an optical interface in the initial optical path, and an optical receiving part permanently positioned in the optical module;
generating an optical signal;
detecting the optical signal in the initial optical path through the optical receiving part; and
irreversibly modifying the optical interface to generate a modified optical interface of the modifiable optical element, wherein the modification of the optical interface is performed in response to the detected optical signal so as to obtain substantially the predetermined optical characteristics for the optical module;
wherein the optical interface of the modifiable optical element comprises a metal layer, and said modifying comprises locally removing said metal layer.

4. A method comprising:
identifying a predetermined optical characteristic for an optical module;
providing an optical module having an initial optical path, and a modifiable optical element, wherein the modifiable optical element includes an optical interface in the initial optical path, and an optical receiving part permanently positioned in the optical module;
generating an optical signal;
detecting the optical signal in the initial optical path through the optical receiving part; and
irreversibly modifying the optical interface to generate a modified optical interface of the modifiable optical element, wherein the modification of the optical interface is performed in response to the detected optical signal so as to obtain substantially the predetermined optical characteristics for the optical module;
wherein said modifying comprises depositing a layer on said interface.

5. A method comprising:
identifying a predetermined optical characteristic for an optical module;
providing an optical module having an initial optical path and a modifiable optical element, wherein the modifiable optical element includes an optical interface in the initial optical path;
generating an optical signal;
detecting the optical signal in the initial optical path; and
irreversibly modifying the optical interface to generate a modified optical interface of the modifiable optical element, wherein the modification of the optical interface is performed in response to the detected optical signal so as to obtain substantially the predetermined optical characteristics for the optical module;
wherein the modifying is performed so as to obtain substantially an optical characteristic selected from the group consisting of: a predetermined coupling efficiency between fibres, a predetermined degree of collimation, a predetermined shape of a radiation beam obtained in the optical module, and a predetermined overlap between a radiation beam obtained in the optical module and a detector surface.

6. A method according to claim 5, wherein the optical characteristic is a predetermined coupling efficiency between fibres.

7. A method according to claim 5, wherein the optical characteristic is a predetermined degree of collimation.

8. A method according to claim 5, wherein the optical characteristic is a predetermined shape of a radiation beam obtained in the optical module and a detector surface.

9. A method comprising:
identifying a predetermined optical characteristic for an optical module;
providing an optical module having an initial optical path and a modifiable optical element, wherein the modifiable optical element includes an optical interface in the initial optical path;
generating an optical signal;
detecting the optical signal in the initial optical path; and
irreversibly modifying the optical interface to generate a modified optical interface of the modifiable optical element, wherein the modification of the optical interface is performed in response to the detected optical signal so as to obtain substantially the predetermined optical characteristics for the optical module, and wherein the modification is selected from the group consisting of (a) varying the transmission coefficient of the modifiable optical element, (b) locally removing a metal layer of the modifiable optical element, and (c) depositing a layer on the optical interface.

10. A method according to claim 9, wherein modifying comprises varying the transmission coefficient of the modifiable optical element.

11. A method according to claim 9, wherein the optical interface of the modifiable optical element comprises a metal layer, and said modifying comprises locally removing said metal layer.

12. A method according to claim 9, wherein said modifying comprises depositing a layer on said interface.

13. A method according to claim 5, wherein the irreversible modifying the optical interface comprises physically modifying the optical interface by machining.

* * * * *